(12) United States Patent
Patki et al.

(10) Patent No.: US 12,248,392 B2
(45) Date of Patent: Mar. 11, 2025

(54) PERFORMING DIAGNOSTIC OPERATIONS ON A TARGET SYSTEM

(71) Applicant: NVIDIA Corporation, Santa Clara, CA (US)

(72) Inventors: Padmanabham Patki, Santa Clara, CA (US); Jue Wu, Los Gatos, CA (US); Chung-Hong Lai, New Taipei (TW); Laurent Dahan, San Jose, CA (US); Marc Delvaux, Palo Alto, CA (US); Chiang Hsu, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 145 days.

(21) Appl. No.: 17/683,210

(22) Filed: Feb. 28, 2022

(65) Prior Publication Data

US 2023/0273873 A1    Aug. 31, 2023

(51) Int. Cl.
*G06F 11/00* (2006.01)
*G06F 11/362* (2025.01)
*G06F 13/42* (2006.01)

(52) U.S. Cl.
CPC ........ *G06F 11/366* (2013.01); *G06F 13/4282* (2013.01); *G06F 2213/0042* (2013.01)

(58) Field of Classification Search
CPC ............... G06F 11/366; G06F 11/0703; G06F 11/0739; G06F 13/4282
See application file for complete search history.

(56) References Cited

U.S. PATENT DOCUMENTS

| | | | | |
|---|---|---|---|---|
| 9,606,175 | B2 * | 3/2017 | Trethewey | G01R 31/3177 |
| 2013/0262928 | A1 * | 10/2013 | Yang | G06F 11/267 |
| | | | | 714/E11.17 |
| 2015/0082017 | A1 * | 3/2015 | Bernon-Enjalbert | |
| | | | | G06F 11/3656 |
| | | | | 713/100 |
| 2016/0259005 | A1 * | 9/2016 | Menon | G01R 31/3177 |
| 2017/0286254 | A1 * | 10/2017 | Menon | G06F 11/3636 |
| 2020/0051318 | A1 | 2/2020 | Muthler et al. | |
| 2021/0241546 | A1 * | 8/2021 | Chafekar | G07C 5/0808 |
| 2023/0273873 | A1 * | 8/2023 | Patki | G06F 13/4282 |
| | | | | 714/38.11 |

OTHER PUBLICATIONS

Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

* cited by examiner

*Primary Examiner* — Philip Guyton
(74) *Attorney, Agent, or Firm* — Davis Wright Tremaine LLP

(57) ABSTRACT

In various examples, a diagnostic circuit is connected to a target system to automatically trigger the target system to enter a diagnostic mode. The diagnostic circuit receives diagnostic data from the target system when the target system performs a diagnostic operation in the diagnostic mode.

41 Claims, 13 Drawing Sheets

PERFORMING DIAGNOSTIC OPERATIONS ON A TARGET SYSTEM

TECHNICAL FIELD

At least one embodiment pertains to a diagnostic circuit that may be used to perform diagnostic operations on a target system. For example, at least one embodiment pertains to using an adapter to perform tracing and/or scanning operations on a System on a Chip that implements various novel techniques described herein. By way of another example, at least one embodiment pertains to an autonomous vehicle including such a System on a Chip.

BACKGROUND

To address potential system issues (e.g., software bugs, hardware issues, and the like) that might potentially cause a system to deviate from its expected behavior, root causes of the system issues may need to be determined. Identifying the root cause(s) of a particular potential system issue sometimes require determination of a specific set of circumstances that, if present, will cause the system to reproduce the particular potential system issue. Unfortunately, determining the set of circumstances may cause a significant delay in addressing the particular potential system issue and may increase time-to-market of products that includes the system.

Further, investigating the root cause(s) of the particular potential system issue may itself negatively impact the system and/or make the root cause(s) more difficult to determine. For example, conducting a trace operation that stores trace values in local memory (e.g., dynamic random-access memory ("DRAM")) can perturb and/or consume memory bandwidth and alter memory access patterns, which may affect system behavior. This can be particularly problematic in situations in which functional logic (e.g., the DRAM bandwidth) of the system is already stressed.

BRIEF DESCRIPTION OF THE DRAWINGS

The present systems and methods for PERFORMING DIAGNOSTIC OPERATIONS ON A TARGET SYSTEM are described in detail below with reference to the attached drawing figures, wherein.

DETAILED DESCRIPTION

Figure 1:
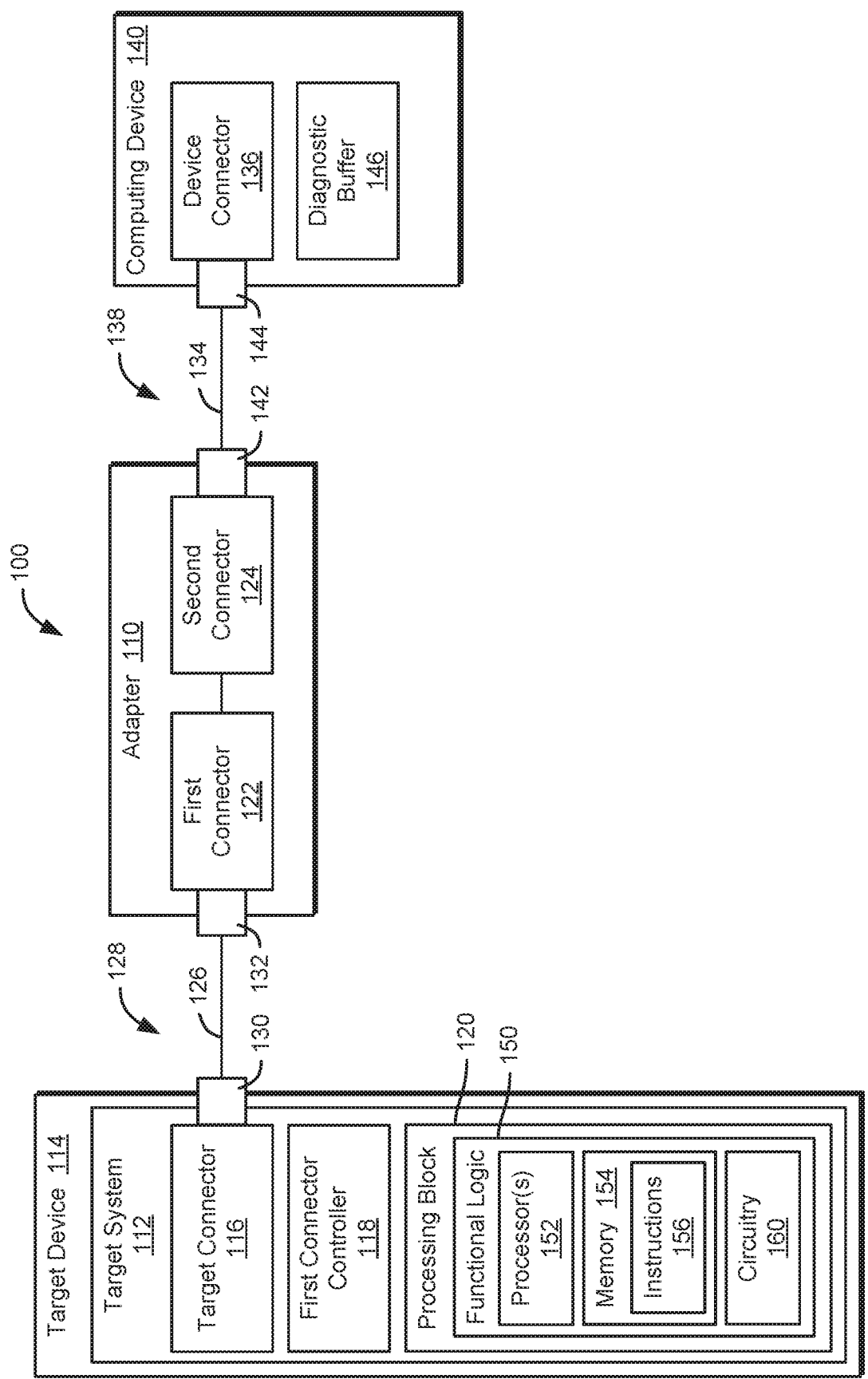
FIG. 1 is an illustration of a block diagram of a system that includes a diagnostic circuit (illustrated as an adapter) used to perform diagnostic operations on a target system, in accordance with some embodiments of the present disclosure.

FIG. 1 is an illustration of a block diagram of a system 100 that includes a diagnostic circuit, illustrated as an adapter 110, used to perform diagnostic operations on a target system 112, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

As mentioned above, the adapter 110 may be used to perform one or more debugging or diagnostic operations on the target system 112, such as one or more tracing operations and/or one or more scan operations (e.g., performed using a Serial Wire Debug ("SWD") protocol). The target system 112 may be installed or intended to be installed in a target device 114, such as an autonomous vehicle, a consumer electrical device (e.g., a laptop, a tablet, a cellular telephone, a smartphone, etc.), a robotic device, and the like. The target system 112 includes circuits that may be implemented on one or more silicon chips. The target system 112 includes a target connector 116, a first connector controller 118, and a processing block 120.

The adapter 110 includes first and second connectors 122 and 124. The first connector 122 may be connected (e.g., by a first cable 126) to the target connector 116 to form a first communication connection 128 that communicates signals (e.g., voltage levels) between the target connector 116 of the target system 112 and the first connector 122 of the adapter 110. The first and target connectors 122 and 116 may each be implemented as a Universal Serial Bus ("USB") Type-C plug, USB Type-C port, and the like. By way of another non-limiting example, the first connector 122 may be implemented as Type-C captive cable, a Type-C extension cable, and the like. In the embodiment illustrated, the first cable 126 includes first and second connectors 130 and 132 that may be connected to the first and target connectors 122 and 116, respectively, to establish the first communication connection 128. The first cable 126 may be implemented as a Type-C extension cable. For ease of illustration, the first and target connectors 122 and 116 have each been illustrated as being USB Type-C connectors; however, this is not a requirement and other types of connectors may be used to implement the first and target connectors 122 and 116.

The second connector 124 of the adapter 110 may be connected (e.g., by a second cable 134) to a device connector 136 of a computing device 140 (e.g., a debugger, a host system, and the like) to form a second communication connection 138. The second and device connectors 124 and 136 may each be implemented as a 40-pin ERM8 plug, a 40-pin ERM8 port, a 40-pin ERF8 socket, a 40-pin ERF8 port, and the like. In the embodiment illustrated, the second cable 134 includes first and second connectors 142 and 144 that may be connected to the second and device connectors 124 and 136, respectively, to establish the second communication connection 138. For ease of illustration, the second and device connectors 124 and 136 have each been illustrated as being 40-pin ERM8 connectors; however, this is not a requirement and other types of connectors may be used to implement the second and device connectors 124 and 136.

The processing block 120 is a circuit that may be implemented as a System on a Chip ("SoC"). The processing block 120 includes functional logic 150, which is a portion of the processing block 120 upon which the computing device (via the adapter 110) may perform diagnostic operations. The functional logic 150 may include one or more processors 152 connected to memory 154 storing instructions 156 that are executable by the processor(s) 152. The instructions 156 implement software executed by the processing block 120 to perform functions of the target system 112. By way of non-limiting examples, the processor(s) 152 may be implemented as a main central processing unit ("CPU") complex, one or more microprocessor, one or more microcontroller, one or more graphics processing units ("GPUs"), one or more data processing units ("DPUs"), and the like. The memory 154 may include volatile memory (e.g., DRAM) and/or nonvolatile memory. The processing block 120 may include circuitry 160 that performs functions of the target system 112. For example, the circuitry 160 may perform automotive SoC functions. By way of non-limiting examples, the circuitry 160 may include hardware implementing one or more displays, one or more automotive input/output ("I/O") controllers, one or more memory controllers, one or more interconnects, etc.

The computing device 140 may capture and/or store diagnostic information (e.g., trace information, scan information, and the like) received from the target system 112 via the adapter 110 in a diagnostic buffer 146. In other words, the target system 112 does not store the diagnostic information in the local memory 154 (e.g., DRAM). Instead, the diagnostic information is transmitted directly from the processing block 120 to the computing device 140. Thus, the local memory 154 is not affected by the diagnostic operation(s) being performed. By way of non-limiting examples, the trace information may include one or more register values and the scan information may include one or more flip-flop states. The trace information may include one or more values of one or more variables used by the software (e.g., implemented by the instructions 156) executing within the processing block 120.

By storing the diagnostic information in the diagnostic buffer 146, the need to reproduce a system issue (e.g., a bug) using the target system 112 is reduced and/or eliminated because the diagnostic buffer 146 will store most of the information related to what may have given rise to the system issue. Thus, the circumstances given rise to the system issue may be investigated and/or simulated without the target system 112.

Field tests may be performed on a final system (e.g., a circuit board, a silicon chip, a circuit, and the like) to avoid differences that might exist between a test system and the final system. For cost reasons, many final systems include only functional interfaces or ports, not specialized debug interfaces or ports. Thus, using prior art methods, it may not be possible to perform diagnostic operations (e.g., trace and/or scan operations) on such final systems. However, such diagnostic operations may be performed on the target system 112 using the adapter 110 because the target system 112 allows diagnostic operations to be performed using the target connector 116, which may be implemented as a functional interface or port (e.g., USB Type-C) intended to be exposed on the final product system (e.g., the target device 114). By way of non-limiting examples, the diagnostic operations may include a low-level debug (e.g., using an SWD), a non-invasive real-time off-chip trace operation (e.g., using a High-Speed Serial Trace Port ("HSSTP")), and/or a scan operation (e.g., a scan dump, a ram dump, and the like).

By enabling field testing of the target system 112, which may include a production or final product platform, the adapter 110 may help reduce the likelihood that a potential system issue (e.g., a bug) may appear after testing on a development platform because of differences in development and final product platforms. In other words, the adapter 110 allows diagnostic operations (e.g., low level debug operations) to be performed on a final product platform directly as well as on other versions (e.g., a test version) of the platform. Further, performing diagnostic operations on the final product platform may help address low level issues, such as the system becoming non-responsive. Thus, the adapter 110 may help reduce time to market and/or may help the system 100 satisfy product specifications by testing and debugging issues in a final product and reducing a need to reproduce the potential system issue(s) through continuous external monitoring. Non-limiting examples of product specifications include stringent safety guidelines required for automobiles, vehicles, autonomous vehicles, edge or Internet of Things ("IoT") devices, and the like.

Time to market may be reduced by installing a target system (e.g., a chip) in a final product platforms before completing comprehensive analysis and test coverage. This may be beneficial because some issues may be specific to the final product platform and are not reproducible in other platforms, such as a development platform. For example, a development platform may be larger and have different routing than the final product platform, which may cause different skews in the final product platform. Similarly, thermal and/or cooling solutions may vary in effectiveness between the final product and its development counterparts. Such variations may lead to low level bugs and/or make their root causes difficult to identify. Performing diagnostic operations using complex hardware and/or controller-based solutions may not be feasible because the complex hardware and/or the controller itself may be prone to the system issues (e.g., bugs) that the diagnostic operations are investigating. Because, in at least some embodiments, the system 100 does not implement a controller-based solution or use complex hardware, it may be desirable to use the system 100 for low-level debug in final product platforms.

Connecting the first and target connectors 122 and 116 together automatically causes the target system 112 to switch from a functional mode of operation to a diagnostic mode of operation in which diagnostic operations (e.g., trace and/or scan operations) may be performed. Hardware on the target system 112 performs this switch and software (e.g., implemented by the instructions 156) executing on the target system 112 (e.g., within the processing block 120) is not involved in performing this switch. Thus, the switch occurs even when the software is not functioning and/or the target system 112 has crashed and/or is non-responsive. In other words, the target system 112 may transmit the diagnostic information to the adapter 110 even after the software (e.g., implemented by the instructions 156) has unexpectedly stopped execution. Thus, if the software generated one or more register values and/or changed the state of one or more flip-flops before the software unexpectedly stopped execution, the diagnostic information may include the register value(s) and/or flip-flop state(s).

In at least one embodiment, the adapter 110 may be hot-plugged into the target system 112. Hot-plugging is an ability to switch between modes of operation of a system (e.g., the target system 112) at run time by simply plugging a device (e.g., the adapter 110) into the system. Hot-plugging allows the first communication connection 128 to be established without shutting down software (e.g., implemented by the instructions 156) executing on the target system 112, powering off the target system 112, or flashing the target system 112. In such embodiments, this hot-plug capability helps avoid the need to flash the target system 112 each time the target system 112 needs to switch from the functional mode to the diagnostic mode and vice versa. Re-flashing a system can be time consuming and difficult in terms of logistics because, for security reasons, only limited resources (e.g., process resources and permissions) are shared for flashing. Thus, at least some embodiments of the target system 112 may save time and/or improve developer convenience by eliminating the need to flash the target system 112 when the target system 112 switches from the functional mode to the diagnostic mode and vice versa. Additionally, this switching occurs entirely in the hardware of the target system 112 and without any assistance from software (e.g., implemented by the instructions 156). In other words, the mode switches are not dependent on software executing in the target system 112. This makes the debug mechanism robust and allows debugging to occur even when the software (e.g., implemented by the instructions 156) has crashed or is nonresponsive.

While the adapter 110 has been illustrated as being a separate component from the target device 114 and the computing device 140, in alternate embodiments, at least some portions of the adapter 110 may be incorporated in the target device 114, the target system 112, and/or the computing device 140.

Figure 2:
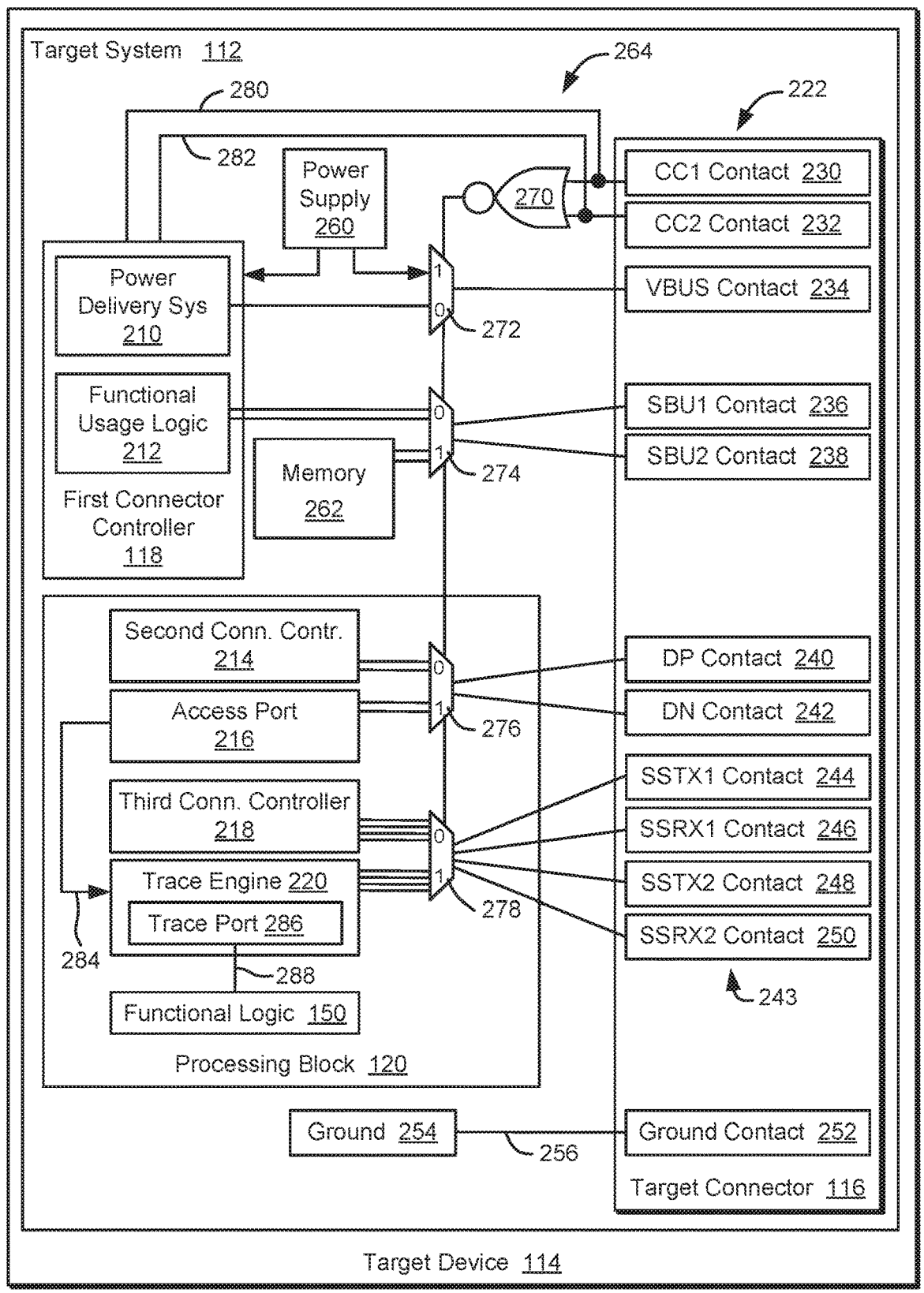
FIG. 2 is an illustration of a circuit diagram illustrating circuit components of the target system of FIG. 1, in accordance with some embodiments of the present disclosure.

FIG. 2 is an illustration of a circuit diagram illustrating circuit components of the target system 112 of FIG. 1, in accordance with some embodiments. Referring to FIG. 2, the first connector controller 118 is a circuit that may include a power delivery system 210 and functional usage logic 212. The processing block 120 may include a second connector controller 214 (e.g., a USB2 controller), an access port 216, a third connector controller 218 (e.g., a USB3 controller), a trace engine 220, and the functional logic 150.

The target connector 116 includes one or more contacts 222 (e.g., pins, tines, pads, and the like). In the embodiment illustrated, the contact(s) 222 include a target CC1 contact 230, a target CC2 contact 232, a target VBUS contact 234, a target SBU1 contact 236, a target SBU2 contact 238, a target D+ or DP contact 240, a target D− or DN contact 242, one or more target trace lane contacts 243, and a target ground contact 252. In the embodiment illustrated, the target trace lane contact(s) 243 include a target SSTX1 contact 244, a target SSRX1 contact 246, a target SSTX2 contact 248, and a target SSRX2 contact 250. The first connector controller 118 is a circuit responsible for communication with the contacts 230-238 when the target system 112 is operating in the functional mode. The second connector controller 214 is a circuit responsible for communication with the contacts 240-242 when the target system 112 is operating in the functional mode. The third connector controller 218 is a circuit responsible for communication with the contacts 244-250 when the target system 112 is operating in the functional mode. The target ground contact 252 is connected to ground 254 by a conductor 256.

In the embodiment illustrated, the target system 112 includes a power supply 260, memory 262, and circuitry 264. The circuitry 264 may include a mode signaling circuit 270 (illustrated as a NOR logic gate) and switches 272-278. The switches 272-278 may each be implemented as a passive switch, such as a multiplexer ("MUX"). The mode signaling circuit 270 generates a mode signal and communicates the mode signal to each of the switches 272-278. The mode signal may be either a diagnostic mode signal or a functional mode signal based on values of the target CC1 and CC2 contacts 230 and 232. In the embodiment illustrated, the mode signaling circuit 270 outputs a high value (e.g., a voltage value) when the target CC1 and CC2 contacts 230 and 232 both have a low value (e.g., a voltage value) and the mode signaling circuit 270 outputs a low value (e.g., a voltage value) when at least one of the target CC1 and CC2 contacts 230 and 232 has a high value (e.g., a voltage value). For ease of illustration, the high value has been illustrated as being "1" and the low value has been illustrated as being "0." The high value output by the mode signaling circuit 270 may be characterized as being the diagnostic mode signal and the low value output by the mode signaling circuit 270 may be characterized as being the functional mode. The diagnostic mode signal causes the circuitry 264 to switch the target system 112 from the functional mode to the diagnostic mode and maintains the target system 112 in the diagnostic mode. On the other hand, the functional mode signal causes the circuitry 264 to switch the target system 112 from the diagnostic mode to the functional mode and maintains the target system 112 in the functional mode.

As will be explained below, the target CC1 and CC2 contacts 230 and 232 will both have the low value when the first connector 122 (see FIGS. 1, 3A, 3B, and 4) of the adapter 110 (see FIGS. 1, 3A, 3B, and 4) is connected to the target connector 116. The first connector controller 118 is connected to the target CC1 and CC2 contacts 230 and 232 by conductors 280 and 282, respectively, and prevents at least one of them from having the low value when the when the first connector 122 of the adapter 110 is not connected to the target connector 116. Thus, the target system 112 operates in the diagnostic mode when the adapter 110 is connected to the target system 112, and the target system 112 operates in the functional mode when the adapter 110 is disconnected from the target system 112.

The components that cause the target system 112 to switch from the functional mode to the diagnostic mode may be characterized as being a passive circuit that provides passive switching from the functional mode to the diagnostic mode. This passive switching may be more robust than using a complex hardware circuit and/or a software sequence to perform the switch, which may be prone to failure.

The switches 272-278 each receive the mode signal as an input and use the mode signal to determines which of two available circuit components to connect to one or more of the contact(s) 222. For example, the mode signal is provided as input (e.g., by a conductor) to the switch 272, which is connected to the power supply 260 (e.g., by a conductor), the power delivery system 210 (e.g., by a conductor), and the target VBUS contact 234 (e.g., by a conductor). The switch 272 connects either the power supply 260 or the power delivery system 210 to the target VBUS contact 234 depending on the mode signal input to the switch 272. When the mode signal is the functional mode signal, the switch 272 connects the power delivery system 210 to the target VBUS contact 234 and disconnects the power supply 260 from the target VBUS contact 234. The power delivery system 210 is a circuit that receives power from the power supply 260 and communicates the power to components within the target system 112 and/or to the target VBUS contact 234 when the target system 112 is operating in the functional mode.

On the other hand, when the mode signal is the diagnostic mode signal, the switch 272 connects the power supply 260 to the target VBUS contact 234 and disconnects the power delivery system 210 from the target VBUS contact 234. In this configuration, the power supply 260 outputs power to the target VBUS contact 234 through the switch 272. Thus, the target system 112 may provide power to the adapter 110 (see FIGS. 1, 3A, 3B, and 4) when the diagnostic mode signal is provided as input to the switch 272.

The mode signal is provided as input (e.g., by a conductor) to the switch 274, which is connected to the functional usage logic 212 (e.g., by a pair of conductors), the memory 262 (e.g., by a pair of conductors), and the target SBU1 and SBU2 contacts 236 and 238 (e.g., by a pair of conductors). The switch 274 connects either the functional usage logic 212 or the memory 262 to the target SBU1 and SBU2 contacts 236 and 238 depending on the mode signal input to the switch 274. When the mode signal is the functional mode signal, the switch 274 connects the functional usage logic 212 to the target SBU1 and SBU2 contacts 236 and 238 and disconnects the memory 262 from the target SBU1 and SBU2 contacts 236 and 238. The functional usage logic 212 is a circuit that communicates with the target SBU1 and SBU2 contacts 236 and 238 when the target system 112 is operating in the functional mode.

On the other hand, when the mode signal is the diagnostic mode signal, the switch 274 provides predetermined values (e.g., voltage values) stored in the memory 262 (e.g., a pair of registers, a pair of contacts, and the like) to the target SBU1 and SBU2 contacts 236 and 238 and disconnects the functional usage logic 212 from the target SBU1 and SBU2 contacts 236 and 238. For example, the memory 262 may include first and second contacts and the predetermined values may be first and second predetermined voltage values, respectively, that the switch 274 outputs to the target SBU1 and SBU2 contacts 236 and 238, respectively, when the switch 274 receives the diagnostic mode signal. The first predetermined voltage value may be lower than the second predetermined voltage value. By way of non-limiting examples, the target SBU1 contact 236 may be set to a low value (e.g., a low voltage) and the target SBU2 contact 238 may be connected to a high impedance that provides an extremely weak driver (e.g., a very low current) that is weaker than the driver (e.g., current) of the target SBU1 contact 236. The predetermined values may be used by the adapter 110 (see FIGS. 1, 3A, 3B, and 4) to provide orientation information to a user.

The mode signal is provided as input (e.g., by a conductor) to the switch 276, which is connected to the second connector controller 214 (e.g., by a pair of conductors), the access port 216 (e.g., by a pair of conductors), and the target DP and DN contacts 240 and 242 (e.g., by a pair of conductors). The switch 276 connects either the second connector controller 214 or the access port 216 to the target DP and DN contacts 240 and 242 depending on the mode signal input to the switch 276. When the mode signal is the functional mode signal, the switch 276 connects the second connector controller 214 to the target DP and DN contacts 240 and 242 and disconnects the access port 216 from the target DP and DN contacts 240 and 242. On the other hand, when the mode signal is the diagnostic mode signal, the switch 276 connects the access port 216 to the target DP and DN contacts 240 and 242 and disconnects the second connector controller 214 from the target DP and DN contacts 240 and 242. By way of a non-limiting example, the access port 216 may be implemented as a serial wire debug protocol debug access port ("SWD-DAP"). For example, the access port 216 may include a two-pin serial interface that includes a clock pin (e.g., SWDCLK) and a bi-directional data pin (e.g., SWDIO).

The mode signal is provided as input (e.g., by a conductor) to the switch 278, which is connected to the third connector controller 218, the trace engine 220, and the target trace lane contact(s) 243. The switch 278 connects either the third connector controller 218 or the trace engine 220 to the target trace lane contact(s) 243 depending on the mode signal input to the switch 278. The third connector controller 218 and the trace engine 220 may be connected to the switch 278 by a number of conductors that include a different conductor for each of the target trace lane contact(s) 243, which in the embodiment illustrated include the target SSTX1, SSRX1, SSTX2, and SSRX2 contacts 244-250. When the mode signal is the functional mode signal, the switch 278 connects the third connector controller 218 to the target trace lane contact(s) 243 and disconnects the trace engine 220 from the target trace lane contact(s) 243. On the other hand, when the mode signal is the diagnostic mode signal, the switch 278 connects the trace engine 220 to the target trace lane contact(s) 243 and disconnects the third connector controller 218 from the target trace lane contact(s) 243.

Within the processing block 120, the access port 216 may be connected to the trace engine 220 by a connection 284 (e.g., one or more conductors). The computing device 140 (see FIGS. 1 and 4) may configure the trace engine 220 (e.g., apply any platform specific configuration) via the target DP and DN contacts 240 and 242, the access port 216, and the connection 284. Such configuration may enable high-speed non-invasive real-time tracing and allow the computing device 140 to store trace information in the diagnostic buffer 146 (see FIGS. 1 and 4).

The trace engine 220 is a circuit that includes a trace port 286 (e.g., a HSSTP) that collects the trace information from the functional logic 150 when the mode signal is the diagnostic mode signal. The trace port 286 is connected to the functional logic 150 by a connection 288 (e.g., one or more conductors).

Figure 3A:
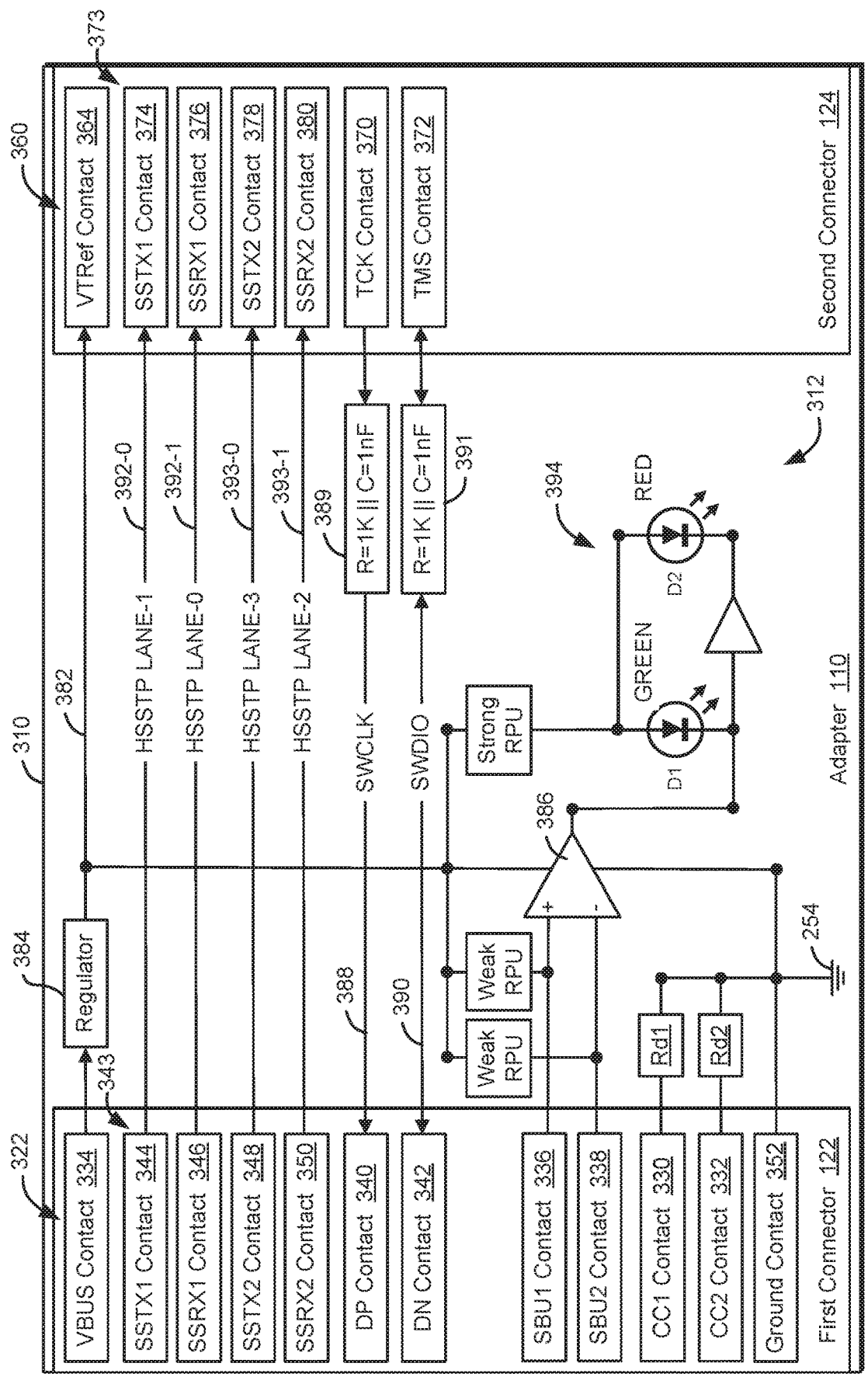
FIG. 3A is an illustration of a circuit diagram illustrating circuit components of the adapter of FIG. 1, in accordance with some embodiments.

FIG. 3A is an illustration of a circuit diagram illustrating circuit components of the adapter 110 of FIG. 1, in accordance with some embodiments. Referring to FIG. 3A, the adapter 110 includes a housing 310 that at least partially houses the first connector 122, the second connector 124, and circuitry 312 that connects the first and second connectors 122 and 124 together. The first connector 122 includes one or more contacts 322 (e.g., pins, tines, pads, and the like). In the embodiment illustrated, the contact(s) 322 include an adapter CC1 contact 330, an adapter CC2 contact 332, an adapter VBUS contact 334, an adapter SBU1 contact 336, an adapter SBU2 contact 338, an adapter D+ or DP contact 340, an adapter D− or DN contact 342, one or more adapter trace lane contacts 343, and an adapter ground contact 352. In the embodiment illustrated, the adapter trace lane contact(s) 343 include an adapter SSTX1 contact 344, an adapter SSRX1 contact 346, an adapter SSTX2 contact 348, and an adapter SSRX2 contact 350.

The second connector 124 includes one or more contacts 360 (e.g., pins, tines, pads, and the like). In the embodiment illustrated, the contact(s) 360 include an adapter VTRef contact 364, an adapter TCK contact 370, an adapter TMS contact 372, and one or more adapter trace lane contacts 373. In the embodiment illustrated, the adapter trace lane contact(s) 373 of the second connector 124 include an adapter SSTX1 contact 374, an adapter SSRX1 contact 376, an adapter SSTX2 contact 378, and an adapter SSRX2 contact 380.

Figure 4:
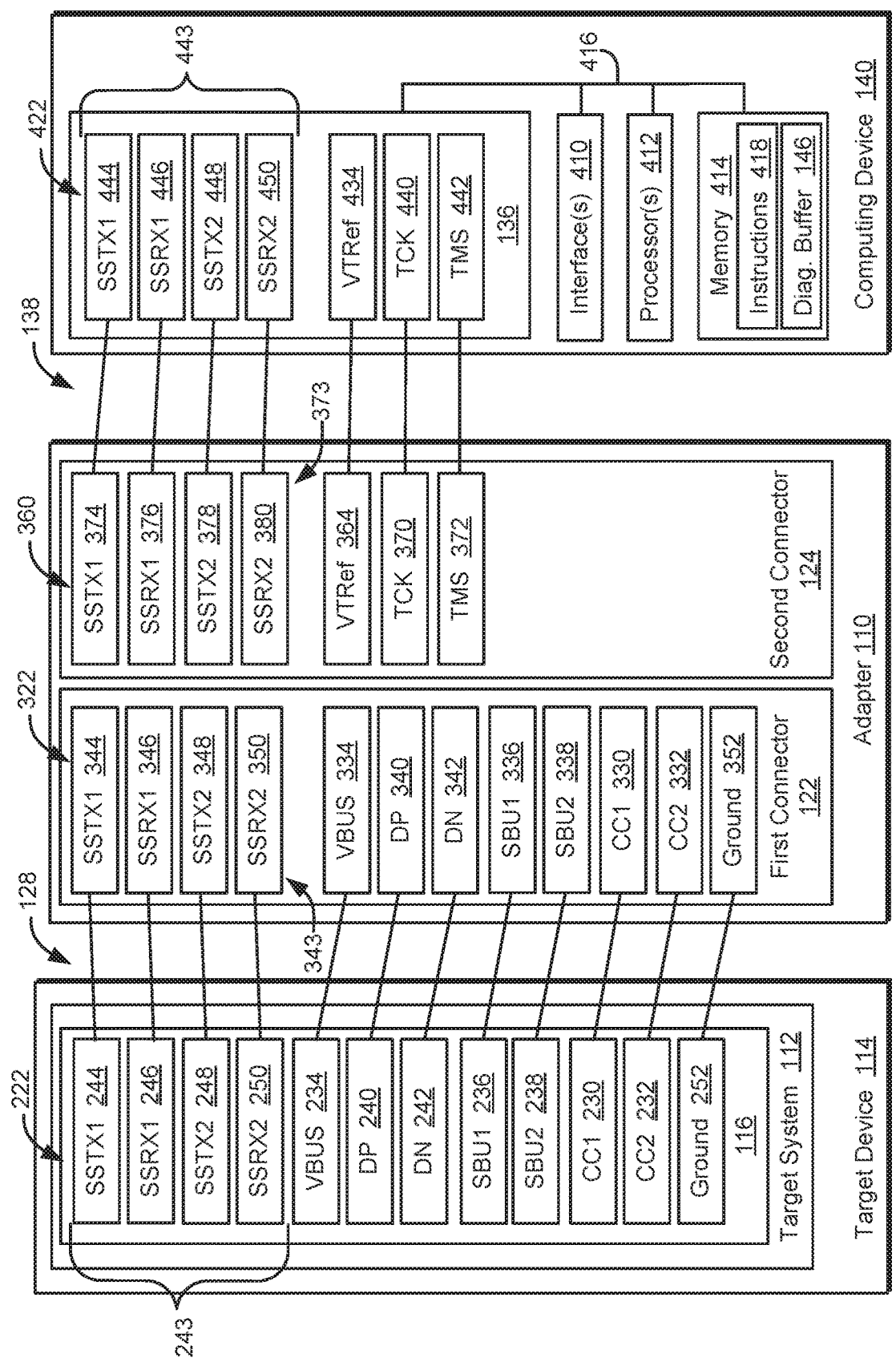
FIG. 4 is an illustration of a block diagram illustrating connections between the target system, the adapter, and a computing device, in accordance with some embodiments of the present disclosure.

FIG. 4 is an illustration of a block diagram illustrating connections between the target system 112, the adapter 110, and the computing device 140, in accordance with some embodiments of the present disclosure. Referring to FIG. 4, the adapter VBUS contact 334 is connected to the target VBUS contact 234 by the first communication connection 128. Thus, when the mode signal is the diagnostic mode signal and the target VBUS contact 234 is connected to the power supply 260 (see FIG. 2), the power supply 260 provides power to the adapter VBUS contact 334. Referring to FIG. 3A, the circuitry 312 includes a conductor 382 that connects the adapter VBUS contact 334 to the adapter VTRef contact 364 and transfers power from the adapter VBUS contact 334 to the adapter VTRef contact 364. In the embodiment illustrated, the conductor 382 is connected to a regulator 384 and an amplifier 386. The regulator 384 may adjust the voltage of the power (e.g., from 5 Volts to 3.3 Volts) provided by the adapter VBUS contact 334 to the adapter VTRef contact 364 and the amplifier 386. The amplifier 386 may amplify signals carried by the adapter SBU1 and SBU2 contacts 336 and 338 that communicate the predetermined values stored by the memory 262 (see FIG. 2).

Referring to FIG. 4, the adapter DP and DN contacts 340 and 342 are connected to the target DP and DN contacts 240 and 242, respectively, by the first communication connection 128. Thus, when the mode signal is the diagnostic mode signal and the target DP and DN contacts 240 and 242 are connected to the access port 216 (see FIGS. 2, 5, and 6), the adapter DP and DN contacts 340 and 342 are also connected to the access port 216. Referring to FIG. 3A, the circuitry 312 includes a conductor 388 that connects the adapter DP contact 340 to the adapter TCK contact 370 and transmits diagnostic information (e.g., a clock signal) between the adapter DP contact 340, which is connected to the access port 216 (see FIGS. 2, 5, and 6), and the adapter TCK contact 370. In the embodiment illustrated, the conductor 388 is connected to a circuit 389 (e.g., a register connected in parallel with a capacitor). The conductor 388 may transmit a clock signal (e.g., SWCLK) from the adapter TCK contact 370 to the adapter DP contact 340, which is connected to the target DP contact 240 (see FIGS. 2, 4, and 5). Alternatively, the conductor 388 may transmit a clock signal that the adapter DP contact 340 received from the target DP contact 240 from the adapter DP contact 340 to the adapter TCK contact 370.

The circuitry 312 includes a conductor 390 that connects the adapter DN contact 342 to the adapter TMS contact 372 and transmits diagnostic information between the adapter DN contact 342, which is connected to the access port 216 (see FIGS. 2, 5, and 6), and the adapter TMS contact 372. In the embodiment illustrated, the conductor 390 is connected to a circuit 391 (e.g., a register connected in parallel with a capacitor). The conductor 390 may transmit trace instructions (e.g., SWDIO) from the adapter TMS contact 372 to the adapter DN contact 342, which is connected to the target DN contact 242 (see FIGS. 2, 4, and 5). The trace instructions may include configuration data. Similarly, the conductor 390 may transmit trace information that the adapter DN contact 342 received from the target DN contact 242 from the adapter DN contact 342 to the adapter TMS contact 372. The trace instructions and/or trace information may be synchronized with the clock signal.

As mentioned above, referring to FIG. 2, the access port 216 may be implemented as a two-pin serial interface that includes a clock pin (e.g., SWDCLK) and a data pin (e.g., SWDIO). Referring to FIG. 4, the target DP contact 240 may be connected to the clock pin and the target DN contact 242 may be connected to the data pin. Thus, the data pin and the clock pin may be connected to the TCK and TMS contacts 370 and 372, respectively.

The adapter trace lane contact(s) 343 is/are connected to the target trace lane contact(s) 243 by the first communication connection 128. Thus, when the mode signal is the diagnostic mode signal and the target trace lane contact(s) 243 is/are connected to the trace engine 220 (see FIGS. 2 and 5), the adapter trace lane contact(s) 343 is/are connected to the trace engine 220. Referring to FIG. 3A, the circuitry 312 includes a conductor that connects each of the adapter trace lane contact(s) 343 to a different one of the adapter trace lane contact(s) 373. For example, in the embodiment illustrated, the circuitry 312 includes conductors 392-0, 392-1, 393-0, and 393-1 that connect the adapter SSTX1, SSRX1, SSTX2, and SSRX2 contacts 344-350, respectively, to the adapter SSTX1, SSRX1, SSTX2, and SSRX2 contacts 374-380, respectively. The adapter SSTX1, SSRX1, SSTX2, and SSRX2 contacts 344-350 transmits trace information received from the trace engine 220 (see FIGS. 2 and 5) to the adapter SSTX1, SSRX1, SSTX2, and SSRX2 contacts 374-380, respectively, over the conductors 392-0, 392-1, 393-0, and 393-1, respectively.

Referring to FIG. 1, the system 100 includes one or more lanes that communicate diagnostic information (e.g., trace information) from the target system 112 to the computing device 140. Thus, the adapter 110 may be characterized as including a portion of each of the lane(s) that extends between the adapter trace lane contact(s) 343 and the adapter trace lane contact(s) 373. The adapter 110 may be used with embodiments that include any number of lanes (e.g., two or four lanes).

For example, referring to FIG. 4, when the target trace lane contact(s) 243 are not reversible, the adapter 110 may include a portion of two lanes. In such embodiments, the target SSTX1 and SSTX2 contacts 244 and 248 of the target system 112 may transmit diagnostic information (e.g., trace information) to the computing device 140 over the adapter SSTX1 and SSTX2 contacts 344 and 348, respectively, and the adapter SSTX1 and SSTX2 contacts 374 and 378, respectively. Also, in such embodiments, the target SSRX1 and SSRX2 contacts 246 and 250 of the target system 112 may receive information from the computing device 140 over the adapter SSRX1 and SSRX2 contacts 346 and 350, respectively, and the adapter SSRX1 and SSRX2 contacts 376 and 380, respectively. Referring to FIG. 3A, in such embodiments, the adapter SSTX1 and SSRX1 contacts 344 and 346, the adapter SSTX1 and SSRX1 contacts 374 and 376, and the conductors 392-0 and 392-1 therebetween define a portion of a first (two-directional) lane. Further, the adapter SSTX2 and SSRX2 contacts 348 and 350, the adapter SSTX2 and SSRX2 contacts 378 and 380, and the conductors 393-0 and 393-1 therebetween define a portion of a second (two-directional) lane.

By way of another non-limiting example, referring to FIG. 4, when at least some of the target trace lane contact(s) 243 are reversible, the adapter 110 may include a portion of four lanes. For example, the target SSRX1 and SSRX2 contacts 246 and 250, which normally receive information (e.g., from the computing device 140) may be reversable and capable of transmitting information. In such embodiments, the target SSTX1, SSRX1, SSTX2, and SSRX2 contacts 244-250 may each transmit trace information on a different lane to the computing device 140. Thus, four lanes may be available for tracing. Referring to FIG. 3A, in such embodiments, the adapter SSRX1 contact 346, the adapter SSRX1 contact 376, and the conductor 392-1 therebetween define a portion of a first lane (labeled "HSSTP LANE-0"). The adapter SSTX1 contact 344, the adapter SSTX1 contact 374, and the conductors 392-0 therebetween define a portion of a second lane (labeled "HSSTP LANE-1"). The adapter SSRX2 contact 350, the adapter SSRX2 contact 380, and the conductor 393-1 therebetween define a portion of a third lane (labeled "HSSTP LANE-2"). The adapter SSTX2 contact 348, the adapter SSTX2 contact 378, and the conductor 393-0 therebetween define a portion of a fourth lane (labeled "HSSTP LANE-3").

Referring to FIG. 4, the adapter SBU1 and SBU2 contacts 336 and 338 are connected to the target SBU1 and SBU2 contacts 236 and 238, respectively, by the first communication connection 128. Thus, when the mode signal is the diagnostic mode signal and the target SBU1 and SBU2 contacts 236 and 238 are connected to the memory 262 (see FIG. 2), the SBU1 and SBU2 contacts 336 and 338 are also connected to the memory 262 and receive the predetermined values therefrom.

As mentioned above, referring to FIG. 3A, the amplifier 386 may amplify the difference in signals carried by the adapter SBU1 and SBU2 contacts 336 and 338. Output of the amplifier 386 is connected to a circuit 394 that includes one or more indicators D1 and D2 (e.g., one or more lights) that indicate whether the first communication connection 128 has the first or second orientation with respect to the target connector 116 of the target system 112. The indicator(s) D1 and D2 may indicate the first connector 122 (see FIGS. 1, 3A, 3B, and 4) has the first (desired) orientation when the driver (e.g., a voltage) of the target SBU2 contact 238 (see FIGS. 2 and 4) is weaker than the driver (e.g., voltage) of the target SBU1 contact 236 (see FIGS. 2 and 4). Otherwise, the indicator(s) D1 and D2 may indicate the first connector 122 has the second (undesired) orientation.

By way of a non-limiting example, the indicators D1 and D2 may be implemented as a green light emitting diode ("LED") and a red LED, respectively. The circuit 394 may illuminate the green LED when the driver (e.g., a current) of the target SBU2 contact 238 (see FIGS. 2 and 4) is weaker than the driver (e.g., current) of the target SBU1 contact 236 (see FIGS. 2 and 4) causing the voltage on the adapter SBU1 Contact 336 to be lower than the voltage on the adapter SBU2 contact 338 (e.g., due to pull-up resistors "Weak RPU" of the adapter 110). On the other hand, the circuit 394 may illuminate the red LED when the driver (e.g., a current) of the target SBU2 contact 238 (see FIGS. 2 and 4) is not weaker than the driver (e.g., current) of the target SBU1 contact 236 (see FIGS. 2 and 4). Thus, the green LED may be lit when the first connector 122 of the adapter 110 is in the first (e.g., desired) orientation with respect to the target connector 116 of the target system 112 and the red LED may be lit when the first connector 122 is in the second (e.g., undesired) orientation with respect to the target connector 116. Based on which of the LEDs is illuminated, the user may determine the orientation of the first connector 122 and correct that orientation, if desired. By way of a non-limiting example, referring to FIG. 1, the user may change the orientation by unplugging the first connector 130 from the target connector 116, rotating the first connector 130 by 180 degrees, and reconnecting the rotated first connector 130 with the target connector 116.

Referring to FIG. 4, the adapter CC1 and CC2 contacts 330 and 332 are connected to the target CC1 and CC2 contacts 230 and 232, respectively, by the first communication connection 128. Referring to FIG. 3A, the adapter CC1 and CC2 contacts 330 and 332 are connected to ground 254 (e.g., by pull-down resistors Rd1 and Rd2, respectively, and/or one or more conductors each). When the first and target connectors 122 and 116 are connected together, the adapter CC1 and CC2 contacts 330 and 332 communicate a low value (e.g., ground voltage) via the first communication connection 128 to the target CC1 and CC2 contacts 230 and 232, respectively, which causes the target CC1 and CC2 contacts 230 and 232 to both have the low value (e.g., ground voltage). As explained above, this causes the processing block 120 to generate the diagnostic mode signal. On the other hand, when the first and target connectors 122 and 116 are disconnected from one another, the first connector controller 118 (see FIGS. 1 and 2) is connected to the target CC1 and CC2 contacts 230 and 232 (e.g., by the conductors 280 and 282 illustrated in FIG. 2) and prevents at least one of them from having the low value. This causes the processing block 120 to generate the functional mode signal.

Referring to FIG. 4, the computing device 140 (e.g., a debugger) includes the device connector 136, one or more interfaces 410, one or more processors 412, and memory 414. The device connector 136, the interface(s) 410, the processor(s) 412, and the memory 414 are connected to one another by one or more buses 416. By way of non-limiting examples, the processor(s) 412 may be implemented as one or more CPUs, one or more microprocessor, one or more microcontroller, one or more GPU, one or more DPU), and the like.

The memory 414 stores the diagnostic buffer 146 and instructions 418 that are executable by at least one of the processor(s) 412. The instructions 418, when executed by the processor(s) 412, may cause the processor(s) 412 to perform diagnostic and/or configuration operations with respect to the target system 112. For example, the instructions 418, when executed by the processor(s) 412, may cause the processor(s) 412 to send one or more instructions to the target system 112 instructing the target system 112 to perform one or more diagnostic operations (e.g., one or more trace operations, one or more scan operations, and the like). The instructions 418, when executed by the processor(s) 412, may cause the processor(s) 412 to send a clock signal (via the device TCK contact 440) to the target system 112. The instructions 418, when executed by the processor(s) 412, may cause the processor(s) 412 to store diagnostic information in the diagnostic buffer 146 and optionally to analyze the diagnostic information and/or display the diagnostic information to the user.

The interface(s) 410 enable(s) communication between the processor(s) 412 and the device connector 136. The interface(s) 410 may include a display device operable to display a graphical user interface ("GUI"). The instructions 418, when executed by the processor(s) 412, may cause the processor(s) 412 to generate a GUI including the diagnostic information and/or information based at least in part on the diagnostic information. The instructions 418, when executed by the processor(s) 412, may cause the processor(s) 412 to display the GUI on the display device.

The device connector 136 includes one or more contacts 422 (e.g., pins, tines, pads, and the like). In the embodiment illustrated, the contact(s) 422 include a device VTRef contact 434, a device TCK contact 440, a device TMS contact 442, and one or more device trace lane contacts 443. In the embodiment illustrated, the device trace lane contact(s) 443 include a device SSTX1 contact 444, a device SSRX1 contact 446, a device SSTX2 contact 448, and a device SSRX2 contact 450.

The device VTRef contact 434 may be connected to the adapter VTRef contact 364 by the second communication connection 138. The second communication connection 138 may conduct power, when present, from the adapter VTRef contact 364 to the device VTRef contact 434.

The device TCK contact 440 may be connected to the adapter TCK contact 370 by the second communication connection 138. The second communication connection 138 conducts the clock signal from the device TCK contact 440 to the adapter TCK contact 370. Alternatively, the second communication connection 138 may conduct the clock signal from the adapter TCK contact 370 to the device TCK contact 440.

The device TMS contact 442 may be connected to the adapter TMS contact 372 by the second communication connection 138. The second communication connection 138 conducts diagnostic information between the adapter TMS contact 372 and the device TMS contact 442.

The device trace lane contact(s) 443 may be connected one each to a different one of the adapter trace lane contact(s) 373 (see FIGS. 3A, 3B, and 4) by the second communication connection 138. The second communication connection 138 conducts trace information between the adapter trace lane contact(s) 373 and the device trace lane contact(s) 443. For example, the second communication connection 138 may conduct trace information from the adapter SSTX1, SSRX1, SSTX2, and SSRX2 contacts 374-380 to the device SSTX1, SSRX1, SSTX2, and SSRX2 contacts 444-450. The computing device 140 may receive and store the trace information in the diagnostic buffer 146.

Figure 3B:
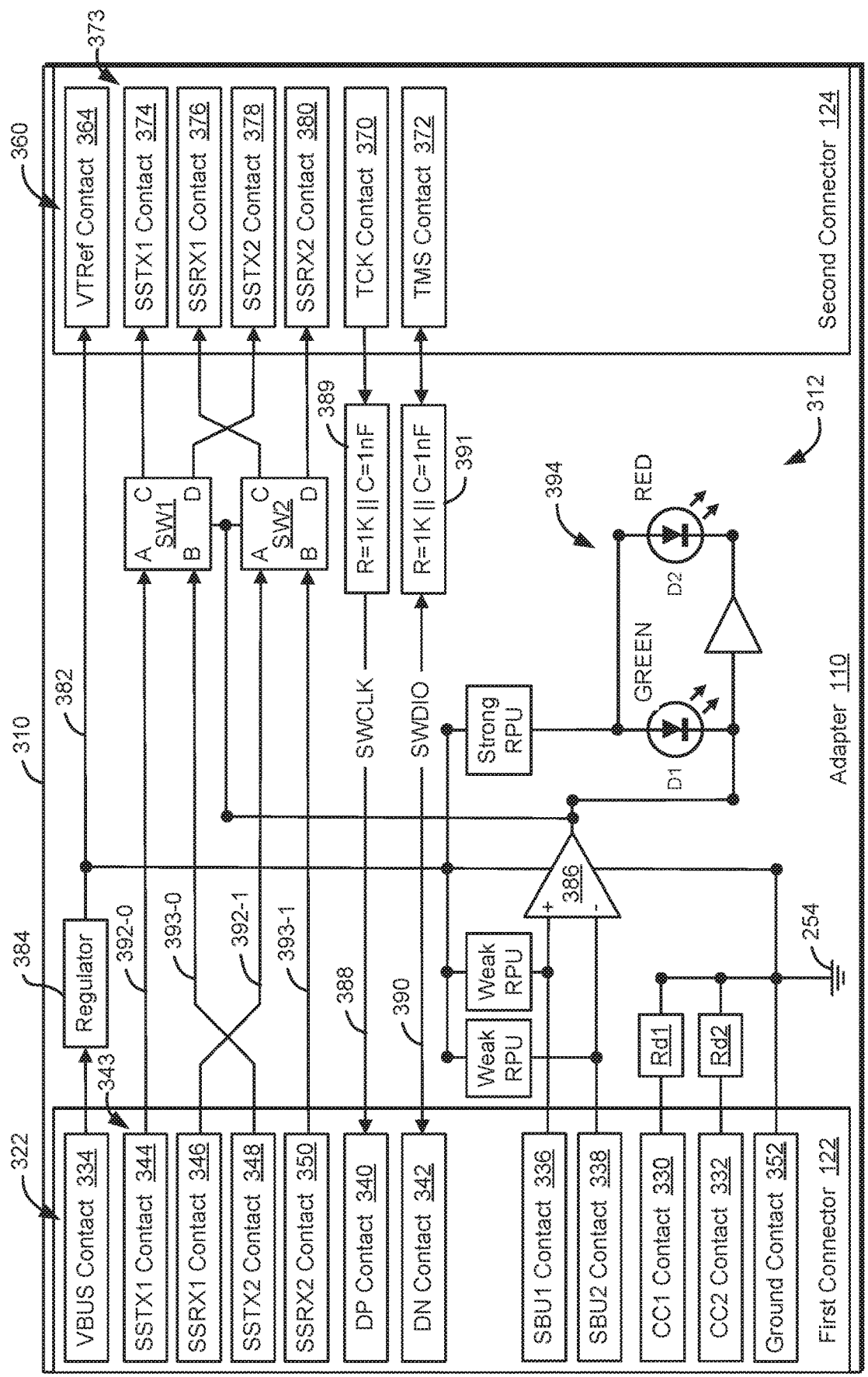
FIG. 3B is an illustration of a circuit diagram illustrating circuit components of an alternate embodiment of the adapter of FIG. 1, in accordance with some embodiments.

FIG. 3B is an illustration of a circuit diagram illustrating circuit components of an alternate embodiment of the adapter 110 of FIG. 1, in accordance with some embodiments. The embodiment of FIG. 3B includes switches SW1 and SW2 that enable the adapter 110 to operate properly when the first connector is in either the first or second orientation respect to the target connector 116. Thus, the user need not manually modify the orientation of (or re-orient) the first connector 122 with respect to the target connector 116 for the adapter 110 to function properly. Optionally, the indicators D1 and D2 may be omitted from the embodiment illustrated in FIG. 3B.

The switches SW1 and SW2 each receives the output of the amplifier 386 as an input and this input determines the state of each of the switches SW1 and SW2. The switches SW1 and SW2 each include inputs "A" and "B" and outputs "C" and "D." The adapter SSTX1 contacts 344 and 348 are connected (e.g., by the conductors 392-0 and 393-0) to the inputs "A" and "B," respectively, of the switch SW1. The outputs "C" and "D" of the switch SW1 are connected (by a pair of conductors) to the adapter SSTX1 contacts 374 and 378, respectively. The adapter SSRX1 contacts 346 and 350 are connected (e.g., by the conductors 392-1 and 393-1) to the inputs "A" and "B," respectively, of the switch SW2. The outputs "C" and "D" of the switch SW2 are connected (by a pair of conductors) to the adapter SSRX1 contacts 376 and 380, respectively.

When the first connector 122 is in the second (undesired) orientation (e.g., the first connector 122 is flipped) with respect to the target connector 116 (see FIGS. 1, 2, and 4), the target SSTX1, SSRX1, SSTX2, and SSRX2 contacts 244-250 are connected to the adapter SSRX2, SSTX2, SSRX1, and SSTX1 contacts 350-344, respectively. When the output of the amplifier 386 indicates that the first connector 122 is in the second (undesired) orientation (e.g., the first connector 122 is flipped) with respect to the target connector 116, the switch SW1 connects its inputs "A" and "B" to its outputs "D" and "C," respectively, and the switch SW2 connects its inputs "A" and "B" to its outputs "D" and "C," respectively. Thus, the adapter SSTX1 contacts 344 and 348 are connected to the adapter SSTX2 contacts 378 and 374, respectively. At the same time, the adapter SSRX1 contacts 346 and 350 are connected to the adapter SSRX2 contacts 380 and 376, respectively. In other words, the adapter SSRX2, SSTX2, SSRX1, and SSTX1 contacts 350-344 are connected to the adapter SSTX1, SSRX1, SSTX2, and SSRX2 contacts 374-380, respectively. Thus, referring to FIG. 4, the target SSTX1, SSRX1, SSTX2, and SSRX2 contacts 244-250 are connected to the adapter SSTX1, SSRX1, SSTX2, and SSRX2 contacts 374-380, respectively. Therefore, the user need not modify the orientation of the first connector 122 with respect to the target connector 116.

On the other hand, referring to FIG. 3B, when the output of the amplifier 386 indicates that the first connector 122 is in the first (desired) orientation with respect to the target connector 116 (see FIGS. 1, 2, and 4), the switch SW1 connects its inputs "A" and "B" to its outputs "C" and "D," respectively, and the switch SW2 connects its inputs "A" and "B" to its outputs "C" and "D," respectively. Thus, the adapter contacts 344-350 are connected to the adapter contacts 374-380, respectively. Therefore, referring to FIG. 4, the target SSTX1, SSRX1, SSTX2, and SSRX2 contacts 244-250 are connected to the adapter SSTX1, SSRX1, SSTX2, and SSRX2 contacts 374-380, respectively.

Because the adapter 110 illustrated in FIG. 3B will connect the target SSTX1, SSRX1, SSTX2, and SSRX2 contacts 244-250 (see FIGS. 2 and 4) to the adapter SSTX1, SSRX1, SSTX2, and SSRX2 contacts 374-380, respectively, independently of the orientation of the first connector 122 with respect to the target connector 116, the switches SW1 and SW2 do not affect the lane(s) of the system 100 (see FIG. 1). Thus, the adapter 110 illustrated in FIG. 3B may be used with embodiments that include any number of lanes (e.g., two or four lanes). By way of a non-limiting example, the adapter 110 illustrated in FIG. 3B may be used with embodiments that include two or four lanes.

Figure 5:
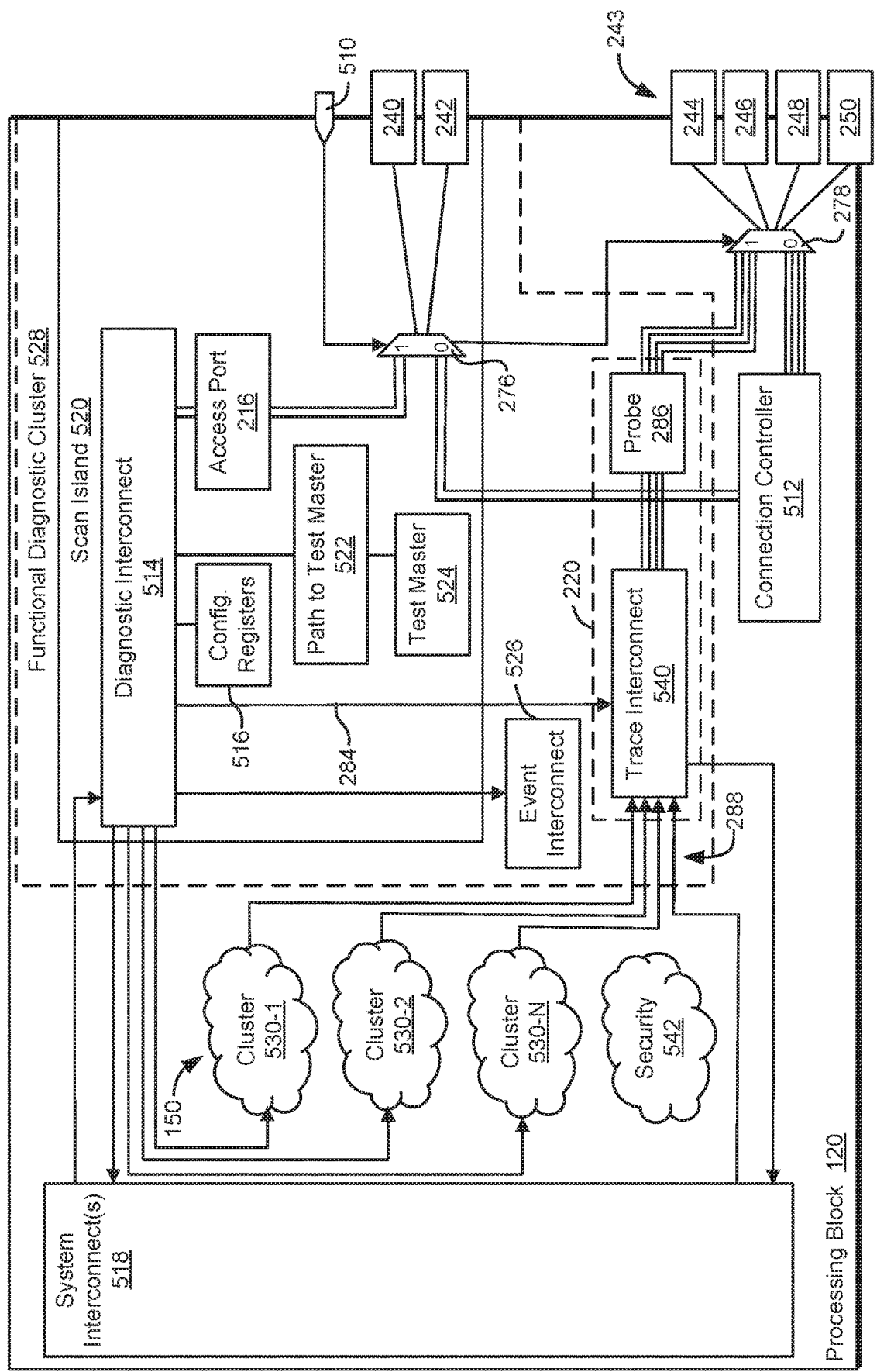
FIG. 5 is an illustration of a circuit diagram illustrating example electrical components of a processing block of the target system of FIG. 1, in accordance with some embodiments of the present disclosure.

FIG. 5 is an illustration of a circuit diagram illustrating example electrical components of the processing block 120, in accordance with some embodiments of the present disclosure. In the embodiment illustrated in FIG. 5, the processing block 120 receives the mode signal (the diagnostic mode signal or the functional mode signal) from the mode signaling circuit 270 (see FIG. 2) via a mode signal conductor 510 (e.g., a pin, a pad, a contact, and the like). The mode signal received from the mode signal conductor 510 is routed to the switches 276 and 278 as described above. For ease of illustration, in FIG. 5, the second and third connector controllers 214 and 218 have been combined and illustrated as a single connector controller 512.

As explained above, the connector controller 512 communicates with the target DP and DN contacts 240 and 242 when the mode signal is the functional mode signal. On the other hand, when the mode signal is the diagnostic mode signal, the access port 216 communicates with the computing device 140 (see FIGS. 1 and 4) via the target DP and DN contacts 240 and 242 and the adapter 110 (see FIGS. 1, 3A, 3B, and 4). The access port 216 may also communicate with the trace engine 220, the functional logic 150, a diagnostic interconnect 514, one or more configuration registers 516, one or more system interconnects 518, a test master 524, and/or an event interconnect 526.

As will be described below, the computer device 140 (see FIGS. 1 and 4) may instruct the target system 112 (see FIGS. 1, 2, and 4) via the access port 216 to perform scan operations. When this occurs, the access port 216 sets one or more values of the configuration register(s) 516 via the diagnostic interconnect 514. This causes the processing block 120 to isolate circuitry, referred to as a scan island 520, from the functional logic 150. The scan island 520 includes the access port 216, the diagnostic interconnect 514, the configuration register(s) 516, the test master 524, and a path 522 from the diagnostic interconnect 514 to the test master 524. The switch 276 may also be positioned within the scan island 520. The scan island 520, the trace engine 220, and the event interconnect 526 may be characterized as being components a functional diagnostic cluster 528 within the processing block 120 (e.g., SoC) that includes and/or implements diagnostic logic. In the embodiment illustrated, the trace engine 220 and the event interconnect 526 are outside the scan island 520.

In the example illustrated in FIG. 5, the functional logic 150 includes one or more processing clusters 530-1 to 530-N that are each connected to the trace engine 220, the diagnostic interconnect 514, and the event interconnect 526. The access port 216 may instruct the processing cluster(s) 530-1 to 530-N via the diagnostic interconnect 514 to provide trace information to the trace engine 220 when the mode signal is the diagnostic mode signal. Similarly, the access port 216 may instruct the processing cluster(s) 530-1 to 530-N via the diagnostic interconnect 514 to stop providing trace information to the trace engine 220 when the mode signal is the functional mode signal.

The processing cluster(s) 530-1 to 530-N may transmit event information to the event interconnect 526 and/or receive event information from the event interconnect 526. By way of non-limiting examples, the event information may include one or more events, predetermined (or preconfigured) information, and the like. For example, the event information may include one or more events generated by the functional logic 150 when the trace operation(s) is/are being performed. The access port 216 may be connected to the event interconnect 526 via the diagnostic interconnect 514 and may communicate with the event interconnect 526. Thus, the event information may include one or more events generated by the diagnostic interconnect 514 and/or the access port 216 in accordance with instructions received by the access port 216 from the computing device 140. The event interconnect 526 may communicate event information to and from the diagnostic interconnect 514.

The event information may be used by one or more of the processing cluster(s) 530-1 to 530-N when the target system 112 is performing a diagnostic operation, such as a trace operation, a scan operation, and the like. For example, instructions received by the access port 216 from the computing device 140 may cause the diagnostic interconnect 514 or a circuit component connected thereto to generate one or more events and communicate the event(s) to the event interconnect 526. The event(s) may cause each processing cluster in a set of the processing cluster(s) 530-1 to 530-N to halt its clock(s), which freezes processing by the set and allows the test master 524 to perform one or more scan operations at a precise moment in execution by the set. By way of additional non-limiting examples, instructions received by the access port 216 from the computing device 140 may cause the diagnostic interconnect 514 or a circuit component connected thereto to generate one or more events and communicate those event(s) to the event interconnect 526, such events may cause a set of one or more of the processing cluster(s) 530-1 to 530-N to start a trace operation, stop a trace operation, and/or insert custom information into a trace operation performed by the set.

Further, the diagnostic interconnect 514 may communicate event information to the access port 216 that the access port 216 may forward to the computing device 140. Thus, the computing device 140 may use this event information to generate instructions and send them to the access port 216. By way of a non-limiting example, when one or more particular events occur in the target system 112, the diagnostic interconnect 514 may communicate the particular event(s) to the access port 216, which informs the computing device 140 of the occurrence of the particular event(s). Then, the computing device 140 may send instructions to the access port 216 that the access port 216 forwards to the diagnostic interconnect 514. Next, the diagnostic interconnect 514 or a circuit component connected thereto instructs a set of one or more of the processing cluster(s) 530-1 to 530-N to take one or more actions in accordance with the instructions received from the computing device 140. Non-limiting examples of the action(s) include inserting one or more timestamps into trace information generated by the set during a trace operation, freezing one or more clocks within the set during a scan operation, generating one or more interrupts in the set, halting one or more cores within the set, freezing one or more timers within the set, etc.

The event interconnect 526 may communicate event information to and from the diagnostic interconnect 514 when the functional logic 150 is otherwise unable to communicate (e.g., has become non-responsive, has crashed, and the like). Thus, the event interconnect 526 may interact with the diagnostic logic (e.g., via the diagnostic interconnect 514) even when the functional logic 150 is not able to communicate.

In the embodiment illustrated, in addition to the trace port 286, the trace engine 220 includes a trace interconnect 540. The trace information routed by the processing cluster(s) 530-1 to 530-N to the trace engine 220 is received by the trace interconnect 540. The access port 216 communicates with the trace interconnect 540 via the diagnostic interconnect 514 and may instruct the trace interconnect 540 to make the trace information available to the trace port 286 when the mode signal is the diagnostic mode signal. When the mode signal is the diagnostic mode signal, the trace port 286 communicates the trace information to the target trace lane contact(s) 243, which are illustrated as the target SSTX1, SSRX1, SSTX2, and SSRX2 contacts 244-250 in FIG. 5. On the other hand, the connector controller 512 communicates with the target trace lane contact(s) 243 when the mode signal is the functional mode signal.

The diagnostic interconnect 514 and/or the trace interconnect 540 may communicates with the system interconnect(s) 518, which is/are connected to other components of the target system 112 (see FIGS. 1, 2, and 4). Such components include the local memory 154 (e.g., DRAM) and/or the processor(s) 152. The processing block 120 may include a security cluster 542, which is a logic circuit that determines whether features and capabilities implemented by the functional logic 150 are available and/or permitted at any given moment. The security cluster 542 communicates with other components of the processing block 120, such as the test master 524, software (e.g., implemented by the instructions 156) executing within the processing block 120, the access port 216, the event interconnect 526, the trace interconnect 540, etc. The security cluster 542 may communicate with these components via side-bands (e.g., dedicated wires that carry signals within the processing block 120) or other interfaces to perform one or more actions. By way of non-limiting examples, the action(s) may include enabling one or more features, disabling one or more features, conveying whether or not a particular feature is available based on an action (e.g., an enable action or a disable action) performed earlier, and the like.

As mentioned above, the computer device 140 (see FIGS. 1 and 4) may instruct the target system 112 (see FIGS. 1, 2, and 4) to perform scan operations via the access port 216. When this occurs, the access port 216 sets the value(s) of the configuration register(s) 516 (via the diagnostic interconnect 514), which causes the processing block 120 to isolate the scan island 520 from the functional logic 150. The scan island 520 isolates the functional logic 150 to be analyzed from the diagnostic logic (of the functional diagnostic cluster 528) that will perform the scan operation(s). For example, such isolation may be useful when the computing device 140 is performing a scan dump, a ram dump, and the like on the target system 112.

The test master 524 and/or the trace engine 220 may transmit diagnostic information (e.g., scan information and/or trace information) to the computing device 140 (see FIGS. 1 and 4) via the adapter 110 (see FIGS. 1, 3A, 3B, and 4) without at least one processor (e.g., the processor(s) 152 illustrated in FIG. 1) managing traffic over the target connector 116. Further, in at least some embodiments, the target system 112 lacks a driver/firmware stack that handles the end-to-end communication. Handling diagnostic (e.g., debug) traffic using such stacks may perturb system behavior in terms of resource allocation (e.g., one or more cores may be reallocated from functional tasks to debug tasks). In other words, the functional and debug tasks share and compete for some of the same resources, such as processing core(s). Similarly, memory bandwidth and patterns may get perturbed as the processing core(s) execute(s) and manage(s) data. This may make reproducing a system issue (e.g., a bug) difficult because many system issues tend to occur when a system is under stress with regard to resource allocation. While additional dedicated resources (e.g., extra cores, dedicated DRAM lanes, and/or dedicated DRAM regions) may be added, doing so can be costly. Thus, at least some embodiments of the system 100 avoid these shortcomings associated with driver/firmware stacks and the expense associated with including additional dedicated resources.

Figure 6:
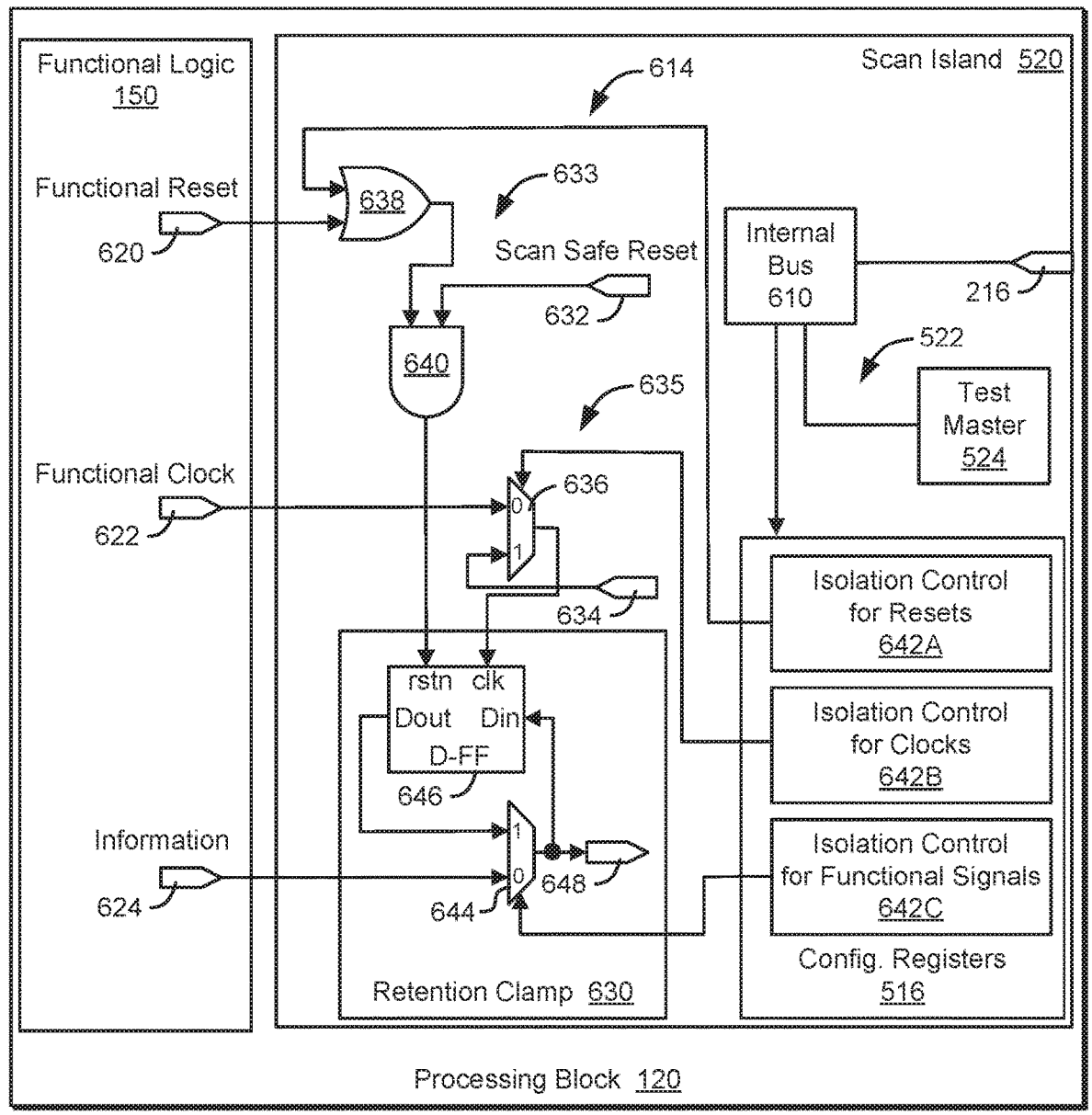
FIG. 6 is an illustration of a circuit diagram illustrating example electrical components of a scan island within the processing block, in accordance with some embodiments of the present disclosure.

FIG. 6 is an illustration of a circuit diagram illustrating example electrical components of the scan island 520, in accordance with some embodiments of the present disclosure. By way of non-limiting examples, the scan island 520 may be used to perform scan operations, such as a scan dump operation and/or a ram dump operation. Such scan operations may provide a state of at least some of data storage elements (e.g., flip-flops) present in the functional logic 150. Thus, the scan operations may provide a low-level debug compared with other types of debugging (e.g., tracing) that are capable of accessing registers but not the state of the flip-flops. The scan island 520 isolates the functional logic 150 to be analyzed by one or more scan operations from the diagnostic logic (of the functional diagnostic cluster 528 illustrated in FIG. 5) that is performing the scan operation(s). To do that, via the access port 216, the configuration register(s) 516 may be programmed to isolate a path from the target DP and DN contacts 240 and 242 all the way to and including the test master 524. The test master 524 is a circuit that performs scan chain movements and drives the scan operation(s).

In the embodiment illustrated in FIG. 6, the scan island 520 includes the configuration register(s) 516, the test master 524, an internal bus 610, and circuitry 614. The internal bus 610 may be a component of the diagnostic interconnect 514 (see FIG. 5). The scan island 520 is connected to the functional logic 150, which includes a functional reset port 620, a functional clock port 622, and an information port 624. The functional reset port 620 communicates a functional reset signal from the functional logic 150 to the scan island 520. The functional clock port 622 communicates a functional clock signal from the functional logic 150 to the scan island 520. The information port 624 communicates information (e.g., the trace information) that is not needed to perform the scan operation(s) from the functional logic 150 to the scan island 520.

To perform one or more scan operations, the computing device 140 (see FIGS. 1 and 4) routes scan instructions to the access port 216, which forwards the scan instructions to the internal bus 610. The scan instructions may include configuration information for the test master 524 and one or more test sequences used to generate scan information. The test sequence(s) may specify one or more transactions to be performed by the test master 524 and/or the functional logic 150. The internal bus 610 forwards the scan instructions to the test master 524. Optionally, the internal bus 610 may convert the scan instructions from an external scan protocol (e.g., SWD protocol) used by the computing device 140 to an internal scan protocol (e.g., JTAG protocol) used by the test master 524 before forwarding the scan instructions to the test master 524.

In alternate embodiments, the scan instructions may be routed by the switch 276 directly to the test master 524 without passing through the access port 216. The scan instructions may be in accordance with the external scan protocol (e.g., SWD protocol) or the internal scan protocol (e.g., JTAG protocol).

The test master 524 may implement the scan instructions by performing the transactions and/or causing the transactions to be performed by the functional logic 150 in accordance with the test sequence(s). The transactions may include JTAG transactions, Design-for-Test ("DFT") transactions, and the like. The DFT transactions, when present, may include low-level flop transactions. The test master 524 may be implemented as a circuit (e.g., a DFT engine) capable of performing scan operations, such as scan dump and/or ram dump.

In the embodiment illustrated, the circuitry 614 includes one or more retention clamps 630, a reset 632, a reset circuit 633, a clock 634, and a clock circuit 635. The reset 632 transmits a scan safe reset signal and may be implemented as a port, contact, pin, pad, and the like. In the embodiment illustrated, the reset circuit 633 includes an OR logic gate 638 and an AND logic gate 640. The clock 634 transmits a scan safe clock signal produced by a scan safe clock or a free running clock. The clock 634 may be implemented as a clock, port, contact, pin, pad, and the like. In the embodiment illustrated, the clock circuit 635 includes a switch 636. The switch 636 may be implemented as a glitchless MUX.

The computing device 140 (see FIGS. 1 and 4) may instruct the retention clamp(s) 630 to isolate(s) the path 522 from the target DP and DN contacts 240 and 242 (see FIGS. 2, 4, and 5) through the access port 216 to the test master 524 from the functional logic 150 by sending one or more predetermined isolation values (e.g., a high value) to the access port 216. The access port 216 may store the predetermined isolation value(s) (or one or more values determined based on the predetermined isolation value(s)) in the configuration register(s) 516. In the example illustrated, the configuration register(s) 516 include an isolation control 642A for resets, an isolation control 642B for clocks, and an isolation control 642C for functional signals.

The reset circuit 633 outputs the functional reset signal received from the functional reset port 620 when the mode signal is the functional mode signal and outputs the scan safe reset signal received from the reset 632 when the mode signal is the diagnostic mode signal. In the embodiment illustrated, the output of the functional reset port 620 and the isolation control 642A for resets are each provided as input (e.g., by a conductor) to the OR logic gate 638. The output of the OR logic gate 638 and the output of the reset 632 are each provided as input (e.g., by a conductor) to the AND logic gate 640. The output of the AND logic gate 640 is provided to the retention clamp(s) 630. The isolation control 642A for resets will have a high value when a scan operation is about to be or is being performed. In other words, isolation control 642A for resets will have a high value when the mode signal is the diagnostic mode signal. When the isolation control 642A for resets has a high value (e.g., 1), the output of the AND logic gate 640 will include a reset signal only when the reset 632 has a low value. Thus, the reset circuit 633 restricts the output of the AND logic gate 640 to the scan safe reset signal output by the reset 632 when the mode signal is the diagnostic mode signal. On the other hand, when the isolation control 642A for resets has a low value (e.g., 0), the output of the AND logic gate 640 triggers a reset (by having a low value) when either the functional reset port 620 or the scan safe reset 632 have low values.

The clock circuit 635 outputs the functional clock signal received from the functional clock port 622 when the mode signal is the functional mode signal and outputs the scan safe clock signal received from the clock 634 when the mode signal is the diagnostic mode signal. In the embodiment illustrated, the isolation control 642B for clocks is provided as input (e.g., by a conductor) to the switch 636, which is connected to the functional clock port 622 (e.g., by a conductor), the clock 634 (e.g., by a conductor), and the retention clamp(s) 630 (e.g., by a conductor). The switch 636 connects either the functional clock port 622 or the clock 634 to the retention clamp(s) 630 depending on the value (e.g., voltage value) of the isolation control 642B for clocks. When the isolation control 642B for clocks indicates a scan operation is about to be or is being performed (e.g., by having a high value), the switch 636 connects the clock 634 to the retention clamp(s) 630 and disconnects the functional clock port 622 from the retention clamp(s) 630. On the other hand, when the isolation control 642B for clocks indicates that a scan operation is not about to occur or is not being performed (e.g., by having a low value), the switch 636 connects the functional clock port 622 to the retention clamp(s) 630 and disconnects the clock 634 from the retention clamp(s) 630.

In the embodiment illustrated, the retention clamp(s) 630 each include a switch 644, a circuit 646, and a scan island port 648. The scan island port 648 provides output from the switch 644 to other components of the scan island 520 (e.g., to the diagnostic interconnect 514). The scan island port 648 may be implemented as a port, contact, pin, pad, and the like.

The isolation control 642C for functional signals is provided as input (e.g., by a conductor) to the switch 644, which is connected to the circuit 646 (e.g., by a conductor), the information port 624 (e.g., by a conductor), and the scan island port 648 (e.g., by a conductor). The switch 644 connects either the circuit 646 or the information port 624 to the scan island port 648 depending on the value (e.g., voltage value) of the isolation control 642C for functional signals. When the isolation control 642C for functional signals indicates a scan operation is about to be or is being performed (e.g., by having a high value), the switch 644 connects the circuit 646 to the scan island port 648 and disconnects the information port 624 from the scan island port 648. Thus, the information (e.g., the trace information) from the information port 624 that is not needed to perform a scan operation is not input into the scan island 520. On the other hand, when the isolation control 642C for functional signals indicates that a scan operation is not about to occur or is not being performed (e.g., by having a low value), the switch 644 connects the information port 624 to the scan island port 648 and disconnects the circuit 646 from the scan island port 648. Thus, the information from the information port 624 that is not needed to perform a scan operation is input into the scan island 520 via the scan island port 648. The switch 644 may be implemented as a MUX.

In the embodiment illustrated, the circuit 646 has an input "rstn," an input "clk," an input "Din," and an output "Dout." The circuit 646 receives the output from the reset circuit 633 (e.g., the output from the AND logic gate 640) at its input "rstn," the output from the clock circuit 635 (e.g., the output from the switch 636) at its input "clk," and the output from the switch 644 at its input "Din." The circuit 646 delays (e.g., until the occurrence of a next rising edge of the clock signal received at input "clk") a change of state of its output signal, which is provided at its output "Dout." Thus, the circuit 646 may synchronize its output signal with the clock signal provided by the clock 634 when a scan operation is about to be or is being performed. The output signal matches an input signal received at the input "Din." In the example illustrated in FIG. 6, the output from the switch 644 is input into the input "Din." When a scan operation is about to be or is being performed, the switch 644 will not output any new signals from the information port 624 so the output of the circuit 646 will be frozen at the last input from the information port 624. Further, the scan safe reset signal may trigger a reset of the circuit 646. Thus, the scan island 520 will be isolated from portions of the functional logic 150 not involved in the scan operation(s). The circuit 646 may be implemented as a delay flip-flop ("D-FF").

Because the configuration register(s) 516 are components of the scan island 520, operation of the retention clamp(s) 630 is controlled from within the scan island 520. The clock 634 used in the scan island 520 is isolated by the clock circuit 635, which switches to the clock 634 to increase scan coverage and avoid functional clock logic, such as phase-locked loops ("PLLs"), clock muxes, etc. The reset circuit 633 isolates resets used by the scan island 520 to prevent any functional reset logic that is being scanned from triggering erroneous resets in the scan island 520.

At the start of a scan operation, the access port 216 may first set the value of the isolation control 642C for functional signals, which will enable the retention clamp(s) 630 on all functional signals entering the scan island 520 (by traversing through a scan island boundary) that are not required for the scan operation. Then, the access port 216 may set the values of the isolation control 642A for resets and the isolation control 642B for clocks, which will cause the clock circuit 635 to switch from the functional clocks (provided by the functional clock port 622) to the clock signal provided by the clock 634, and the reset circuit 633 to switch from the functional resets (received via the functional reset port 620) to resets provided by the scan-safe reset 632.

Figure 7:
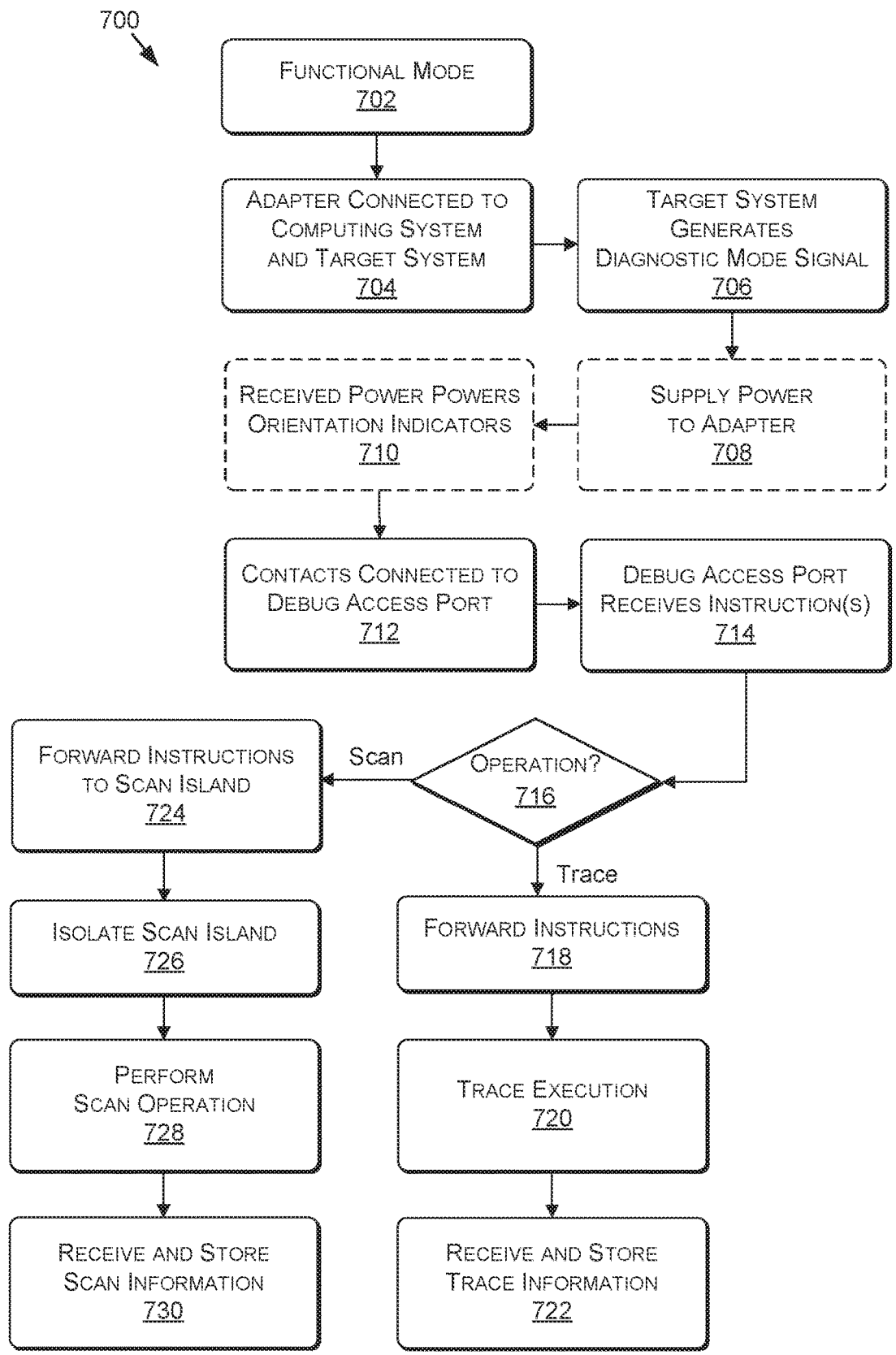
FIG. 7 is a flow diagram showing a method for using the adapter to implement diagnostic operations on the target system, in accordance with some embodiments of the present disclosure.

Referring to FIG. 7, each block of a method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, the method 700 is described, by way of example, with respect to the system 100 of FIG. 1. However, the method 700 may additionally or alternatively be executed by any one system, or any combination of systems, including, but not limited to, those described herein.

FIG. 7 is a flow diagram showing the method 700 for using the adapter 110 to implement diagnostic operations on the target system 112, in accordance with some embodiments of the present disclosure. The method 700 begins with the adapter 110 disconnected from the target system 112. Referring to FIG. 7, at first block 702, the target system 112 generates the functional mode signal as described above and the target system 112 operates in the functional mode.

Then, at block 704, a user connects the first connector 122 of the adapter 110 to the target connector 116 of the target system 112 and connects the second connector 124 of the adapter 110 to the device connector 136 of the computing device 140. As explained above, when the adapter 110 is connected to the target system 112, the target CC1 and CC2 contacts 230 and 232 will each have the low value because the adapter CC1 and CC2 contacts 330 and 332 are each connected to ground 254. Thus, the adapter CC1 and CC2 contacts 330 and 332 may be characterized as driving each of the target CC1 and CC2 contacts 230 and 232 to the low value. This occurs independently of power being received by the adapter 110 and relies only on the connection of the adapter CC1 and CC2 contacts 330 and 332 to ground 254.

Next, at block 706, the target system 112 generates the diagnostic mode signal as described above. Thus, at block 706, the target CC1 and CC2 contacts 230 and 232 will each have the low value, which as described above, causes the mode signaling circuit 270 (see FIG. 2) of the circuitry 264 (see FIG. 2) to generate the diagnostic mode signal and transmit the diagnostic mode signal to other components of the circuitry 264. For example, the circuitry 264 may include the mode signal conductor 510 (see FIG. 5) and the diagnostic mode signal may be transmitted to the mode signal conductor 510 in block 706.

Then, in optional block 708, the diagnostic mode signal may cause the target system 112 to supply power to the adapter 110. At optional block 710, referring to FIG. 3A, the power received by the adapter 110 may power one of the indicators D1 and D2 (e.g., a green LED and a red LED) based on the values of (e.g., voltage driven on) the target SBU1 and SBU2 contacts 236 and 238 (see FIGS. 2 and 4). By way of a non-limiting example, when the indicator(s) D1 and D2 are implemented as a green LED and a red LED, the power may illuminate the green LED when the first connector 122 (see FIGS. 1, 3A, 3B, and 4) has the first (desired) orientation (e.g., is not flipped). On the other hand, the power may illuminate the red LED when the first connector 122 has the second (undesired) orientation (e.g., is flipped). Based on which of the indicators D1 and D2 is illuminated, the user can modify the orientation of the first connector 122 with respect to the target connector 116, if necessary. By way of a non-limiting example, the orientation may be modified by unplugging the first connector 130 from the target connector 116, rotating the first connector 130 180 degrees, and reconnecting the rotated first connector 130 with the target connector 116.

In embodiments in which the optional blocks 708 and 710 are omitted, the method 700 may progress from the block 706 to the block 712.

As mentioned above, the diagnostic mode signal may be transmitted to the mode signal conductor 510 (e.g., a pin) or otherwise conducted to other components of the processing block 120 (e.g., an SoC). At block 712, the access port 216, which may be characterized as being a debug controller, is connected to the target DP and DN contacts 240 and 242 and the second connector controller 214 is internally disconnected from the target DP and DN contacts 240 and 242. From the perspective of the second connector controller 214, it may appear as if no device is connected to the target connector 116 while the adapter 110 is connected to the target connector 116.

In block 714, the access port 216 receives one or more instructions from the computing device 140. The instruction(s) instruct the target system 112 to perform at least one diagnostic operation, such as a trace operation or a scan operation. Referring to FIG. 4, the computing device 140 transmits the instruction(s) using the device TCK and TMS contacts 440 and 442, which are connected to the TCK and TMS contacts 370 and 372 of the second connector 124 of the adapter 110. The TCK and TMS contacts 370 and 372 transmit the instruction(s) to the adapter DP and DN contacts 340 and 342, which transmit the instruction(s) to the target DP and DN contacts 240 and 242. In block 712, the target DP and DN contacts 240 and 242 are connected to the access port 216, which forwards the instruction(s) to the diagnostic interconnect 514 (see FIG. 5).

After the diagnostic interconnect 514 (see FIG. 5) receives the instruction(s), in decision block 716, the diagnostic interconnect 514 determines whether the instruction(s) instruct the target system 112 to perform a trace operation or a scan operation. When the diagnostic interconnect 514 determines a trace operation is to be performed, the diagnostic interconnect 514 advances to block 718. On the other hand, when the diagnostic interconnect 514 determines a scan operation is to be performed, the diagnostic interconnect 514 advances to block 724.

In block 718, referring to FIG. 5, the diagnostic interconnect 514 forwards the instruction(s) to the trace engine 220, the functional logic 150, and/or the event interconnect 526. The instruction(s) may configure the trace engine 220, the functional logic 150, and/or the event interconnect 526 without involving software (e.g., implemented by the instructions 156) executing within the processing block 120 and/or perturbing any functional paths. The diagnostic interconnect 514 and/or the trace interconnect 540 may send information to the system interconnect 518. But, referring to FIG. 1, the trace operation does not cause the functional logic 150 to store the trace information in the memory 154. Instead, the trace information is stored in the diagnostic buffer 146. Thus, the trace operation will not impact the bandwidth of the memory 154 or its memory access patterns.

In block 720 (see FIG. 7), the processing block 120 performs the trace operation. In block 720, referring to FIG. 5, the instruction(s) cause the functional logic 150 to send trace information to the trace engine 220 and the trace engine 220 to send the trace information to the target trace lane contact(s) 243. Depending on the type of contact used to implement each of the target trace lane contact(s) 243, at least some of the target trace lane contact(s) 243 may be reversible. For example, the target SSRX1 and SSRX2 contacts 246 and 250, which normally receive information (e.g., from the computing device 140) may be reversable and capable of transmitting information. In such embodiments, the target SSTX1, SSRX1, SSTX2, and SSRX2 contacts 244-250 may each function as a lane and transmit trace information to the computing device 140. Thus, four lanes may be available for tracing. On the other hand, the target SSRX1 and SSRX2 contacts 246 and 250 are not reversable, the trace information may be sent over two lanes that include the target SSTX1 and SSTX2 contacts 244 and 248.

In block 722 (see FIG. 7), the computing device 140 receives (e.g., into the diagnostic buffer 146) the trace information from the trace engine 220 via the target trace lane contact(s) 243, the first communication connection 128, the adapter trace lane contact(s) 343, the adapter trace lane contact(s) 373, the second communication connection 138, and the device trace lane contact(s) 443. The computing device 140 may store and/or analyze the trace information. The computing device 140 may generate and display to the user a graphical user interface including the trace information and/or values based at least in part on the trace information. Then, referring to FIG. 7, the method 700 terminates after the block 718.

When in decision block 716, the diagnostic interconnect 514 (see FIG. 5) determined a scan operation is to be performed, in block 724, the access port 216 (see FIGS. 2, 5, and 6) forwards the instruction(s), which include the predetermined isolation value(s) to the diagnostic interconnect 514. Referring to FIG. 5, the diagnostic interconnect 514 stores the predetermined isolation value(s) (or one or more values determined based on the predetermined isolation value(s)) in the configuration register(s) 516.

In block 726 (see FIG. 7), the processing block 120 isolates the scan island 520 from the functional logic 150 as described above.

In block 728, the processing block 120 performs the scan operation. As mentioned above, the (scan) instruction(s) may include the configuration information for the test master 524 and the test sequence(s) used to generate the scan information. The test master 524 may implement the (scan) instruction(s) by performing the transactions and/or causing the transactions to be performed by the functional logic 150 in accordance with the test sequence(s). The test master 524 sends the scan information to the computing device 140 over the target DP and DN contacts 240 and 242.

In block 730, the computing device 140 receives (e.g., into the diagnostic buffer 146) the scan information from the test master 524 via the target DP and DN contacts 240 and 242, the first communication connection 128, the adapter DP and DN contacts 340 and 342, the TCK and TMS contacts 370 and 372, the second communication connection 138, and the device the TCK and TMS contacts 440 and 442. The computing device 140 may store and/or analyze the scan information. The computing device 140 may generate and display to the user a graphical user interface including the scan information and/or values based at least in part on the scan information. Then, referring to FIG. 7, the method 700 terminates after the block 730.

Referring to FIG. 1, the adapter 110 may be used to perform field testing on circuit boards before they are installed in a product. For example, the adapter 110 may be used to perform field tests on one or more target system of an autonomous vehicles. These field tests help identify bugs present in the target system(s) (e.g., caused by differences between development circuit boards and final product circuit boards) after the target system(s) has/have been tested. The adapter 110 allows a user to diagnose different categories of bugs during field testing, including functional bugs and performance bugs. By way of a non-limiting example, a functional bug includes a hard hang where a system is non-responsive. By way of another non-limiting example, a performance bugs includes an instance in which the software (e.g., implemented by the instructions 156) is expected to take an action within a certain amount of time (e.g., apply the brakes within 50 milliseconds after observing an obstruction in the driving path of the vehicle) but fails to take the action within that amount of time.

The low-level debug capability of the adapter 110 allows tracing and/or scan operations to be performed, which are used by the user (e.g., operating the computing device 140) to debug functional bugs even when the target system has crashed or experiences a hard hang. The adapter 110 may help implement continuous non-invasive real-time high-speed off-chip tracing that allows data capture to occur during field tests without affecting system behavior, which provides insight into what led to performance bugs and reduces the need to reproduce the issue multiple times. This may be especially useful in field tests, where it is sometimes unclear which real-world stimulus might have triggered the performance issue making the performance issue difficult to reproduce. Further, it is sometimes necessary to determine the root cause of an observed bug irrespective of how difficult the bug is to reproduce. The adapter 110 may help find bugs in final product system faster, which may help reduce time-to-market and at the same time help satisfy stringent automotive safety requirements.

Example Autonomous Vehicle

Figure 8A:
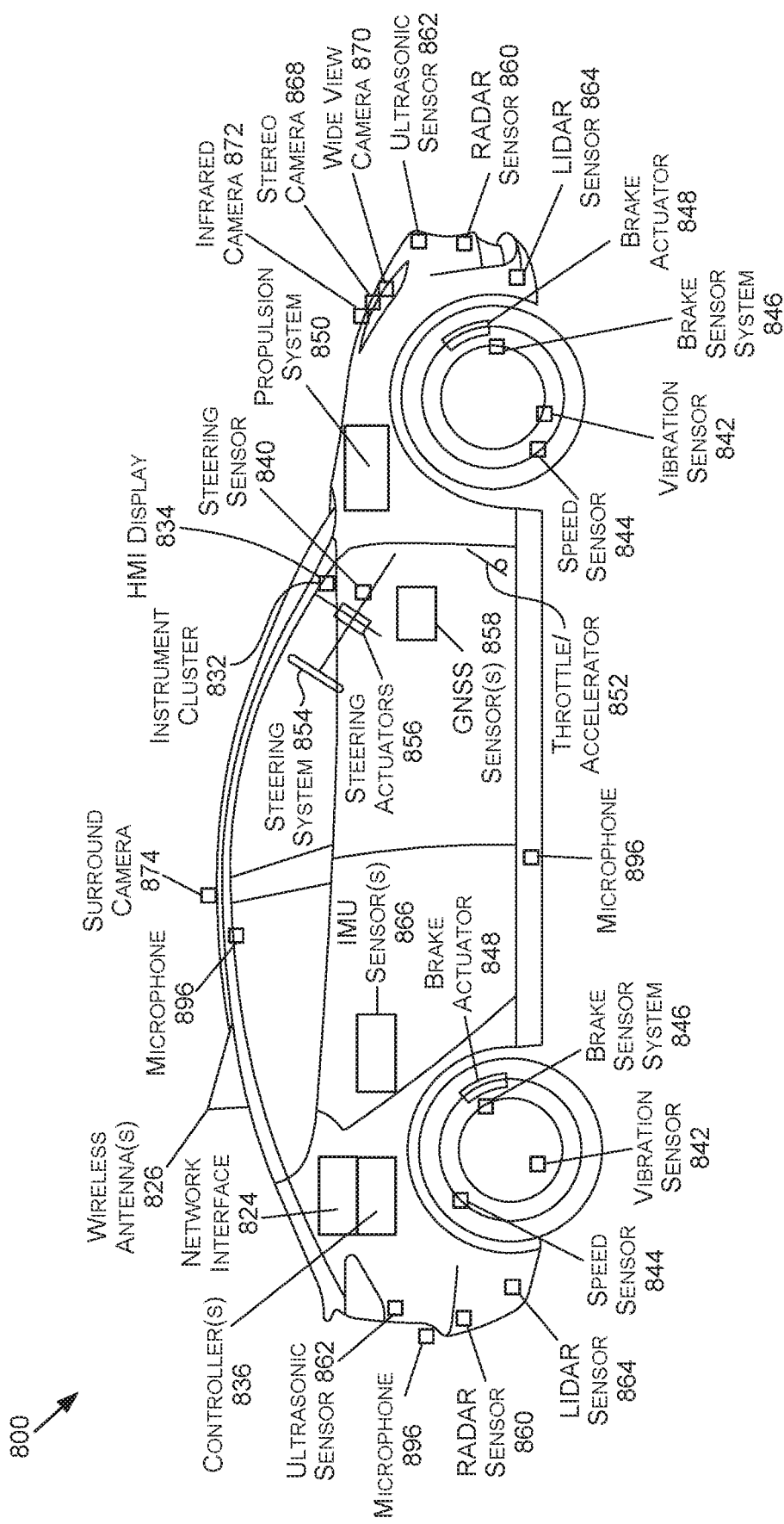
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more CPU(s), system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, and/or to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) 846 (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the location of the vehicle 800, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824, which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
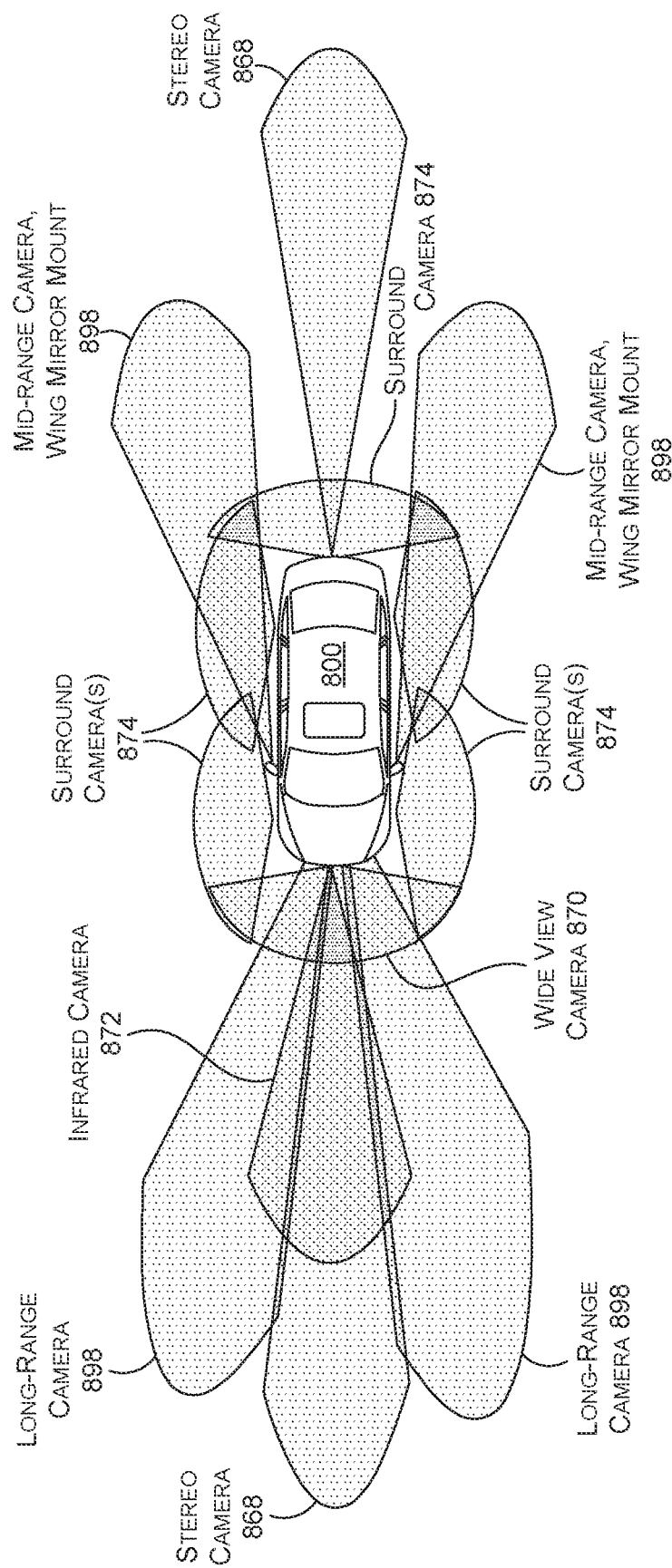
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 800 (e.g., front-facing cameras) may be used for surround view, to help identify forward-facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that includes portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned around the vehicle 800. The surround camera(s) 874 may include wide-view camera(s) 870, fisheye camera(s), 360-degree camera(s), and/or the like. For example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround-view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
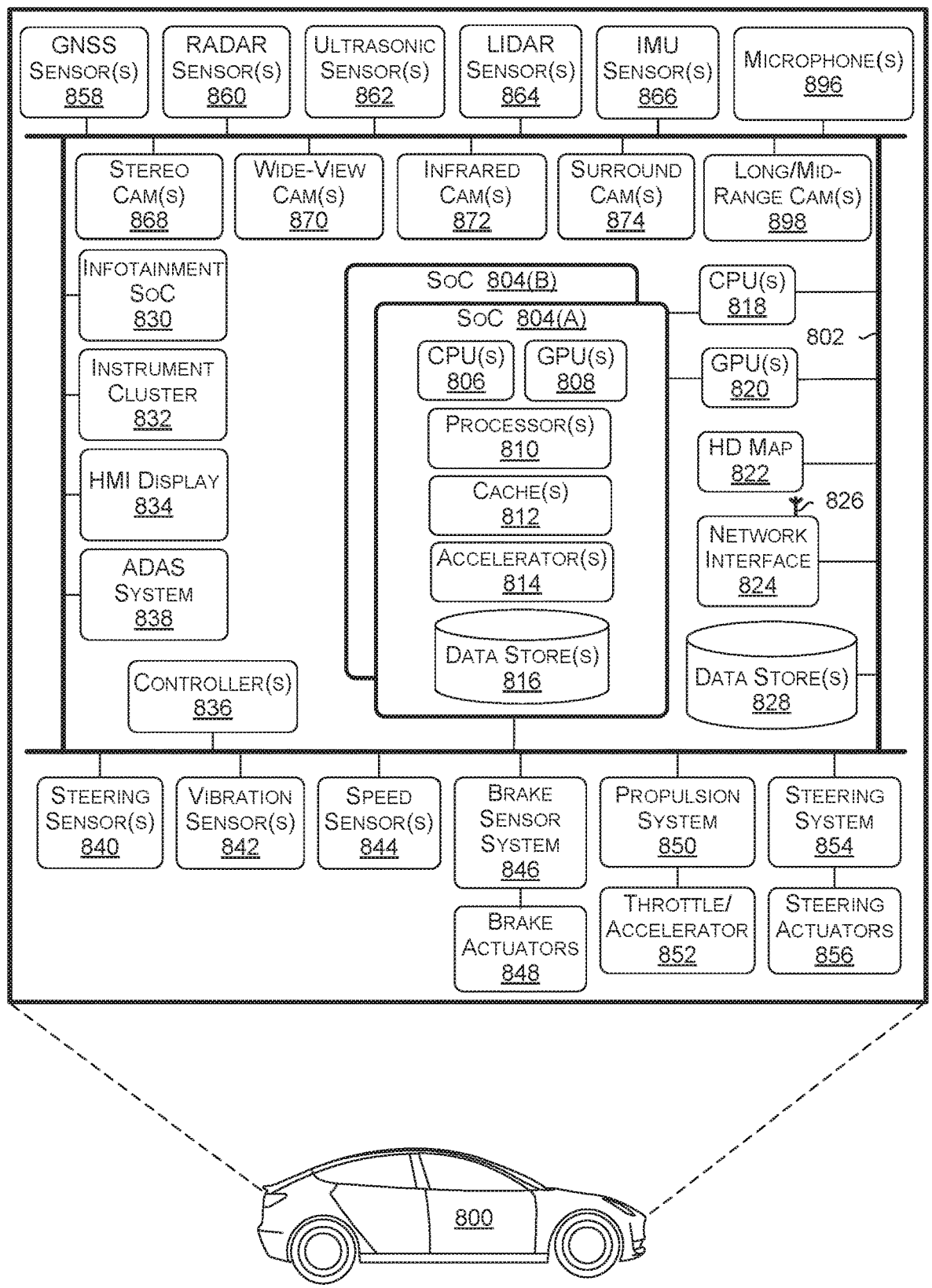
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C is illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol.

In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800 and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use computer-based application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting, and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected to both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 816 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe-stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and actively performing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always-on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, which use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include an SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828, which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858 (e.g., GPS and/or assisted GPS sensors), to assist in mapping, perception, occupancy grid generation, and/or path planning functions. Any number of GNSS sensor(s) 858 may be used, including, for example and without limitation, a GPS using a USB connector with an Ethernet to serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data, in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 800 at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 100 m, with an accuracy of 2 cm-3 cm, and with support for a 100 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include an SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjusts the vehicle speed to maintain a safe distance from vehicles ahead. Lateral ACC performs distance keeping, and advises the vehicle 800 to change lanes when necessary. Lateral ACC is related to other ADAS applications such as LC and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 800), while the I2V communication concept provides information about traffic farther ahead. CACC systems may include either or both I2V and V2V information sources. Given the information of the vehicles ahead of the vehicle 800, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network that is trained and thus reduces the risk of false positives, as described herein.

The vehicle 800 may further include the infotainment SoC 830 (e.g., an in-vehicle infotainment system (IVI)). Although illustrated and described as an SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 800. For example, the infotainment SoC 830 may include radios, disk players, navigation systems, video players, USB and Bluetooth connectivity, carputers, in-car entertainment, Wi-Fi, steering wheel audio controls, hands-free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe-stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
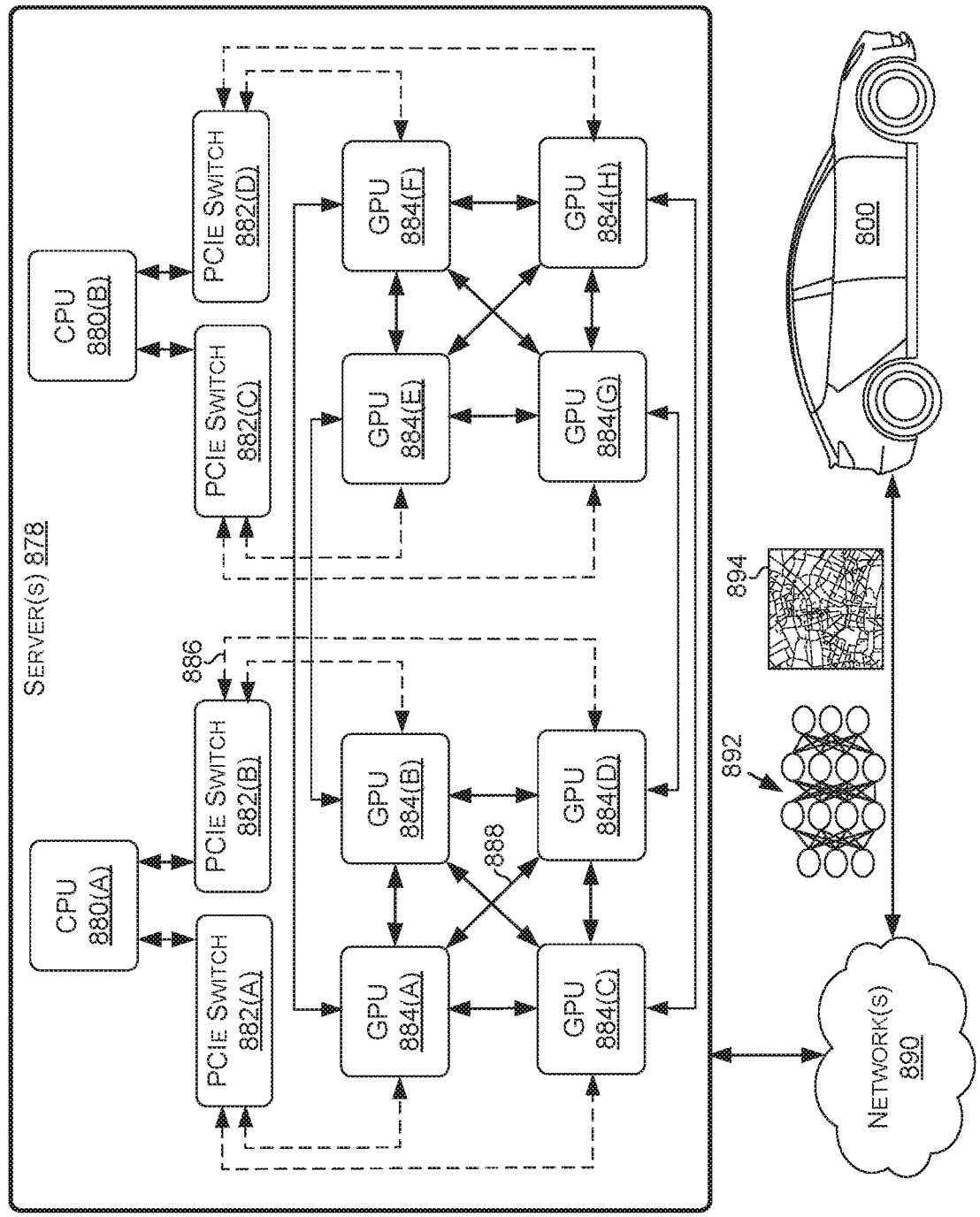
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced roadwork. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

The target device 114 (see FIGS. 1 and 4) may be implemented as the vehicle 800. In such embodiments, the processing block 120 (see FIGS. 1, 2, 5, and 6) may be implemented as one of the SoCs 804 (see FIG. 8C). Referring to FIG. 8C, the processor(s) 152 may be implemented by the CPU(s) 806, the GPU(s) 808, and/or the processor(s) 810. The memory 154 may be implemented by the cache(s) 812 and/or the data store(s) 816. The functional logic 150 may include the accelerator(s) 814 and/or other components not illustrated in FIG. 8C.

Example Computing Device

Figure 9:
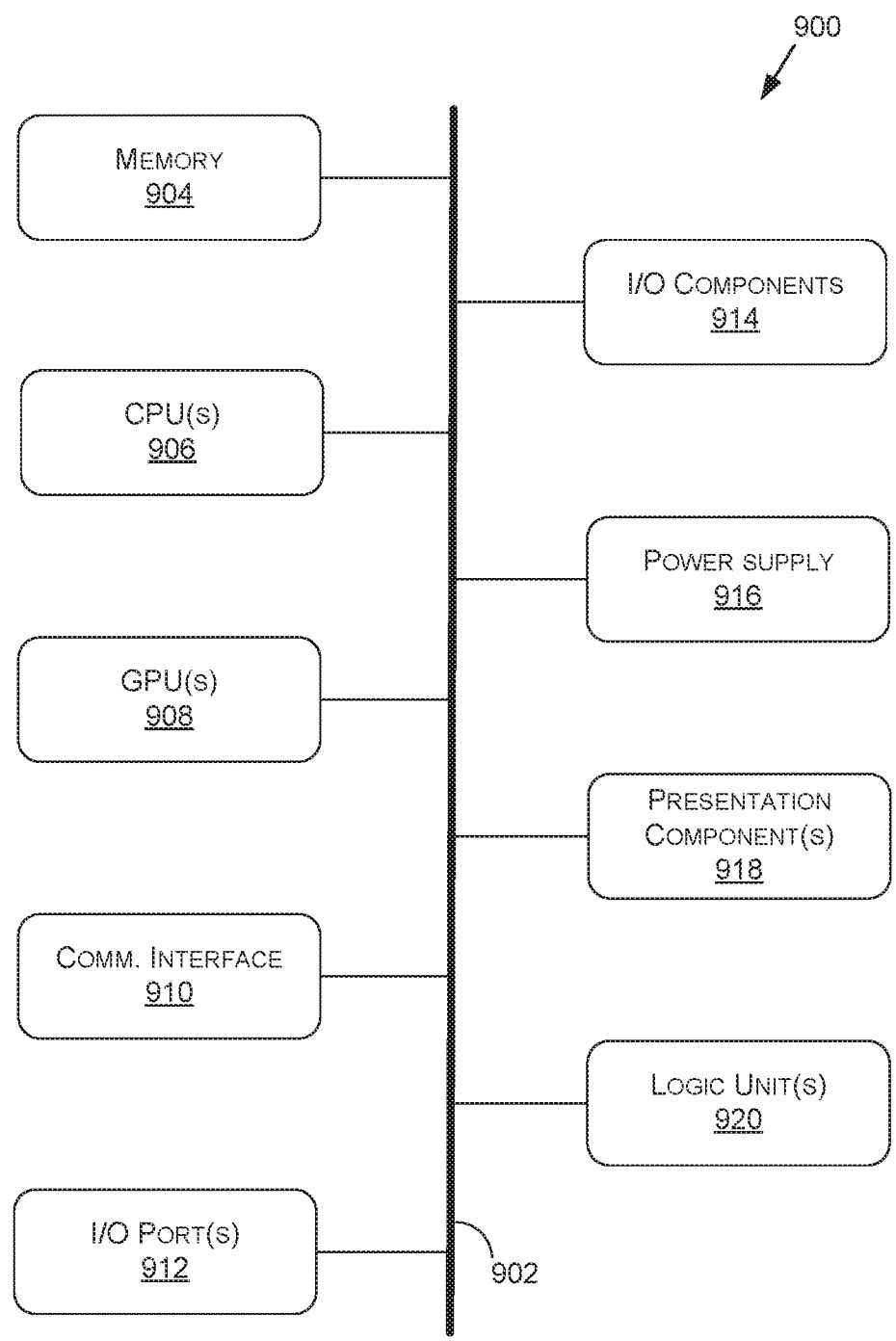
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, I/O ports 912, input/output components 914, a power supply 916, one or more presentation components 918 (e.g., display(s)), and one or more logic units 920.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point, connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, including wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built into (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

In at least one embodiment, the computing device 140 (see FIGS. 1 and 4) may be implemented as one of the computing device(s) 900. In such embodiments, the processor(s) 412 may be implemented by the CPUs 906, the GPUs 908, and/or the logic unit(s) 920; the memory 414 may be implemented by the memory 904; and the interface(s) 410 may be implemented by the communication interface 910, the I/O ports 912, the input/output components 914, and/or the presentation component(s) 918 (e.g., display(s)).

At least one embodiment of the disclosure can be described in view of the following clauses:

1. A device comprising: a first connector that, when connected to a deployed target system, automatically triggers the target system to enter a diagnostic mode corresponding to an in-field test and receives diagnostic data from the target system while the target system is in the diagnostic mode; and a second connector to send the diagnostic data to a computing system, wherein the device comprises a removable peripheral interface between the deployed target system and the computing system.

2. The device of clause 1, wherein the first connector comprises first and second contacts connected to ground, the first and second contacts to trigger the target system to automatically enter the diagnostic mode when connected to the target system.

3. The device of clause 1 or 2, further comprising: at least one indicator that indicates an orientation of the first connector with respect to the target system based at least in part on at least one signal received from the target system.

4. The device of clause 3, wherein the first connector is a Universal Serial Bus ("USB") Type-C connector comprising an SBU1 contact and an SBU2 contact, the SBU1 contact is to receive a first signal comprising a first value from the target system, the SBU2 contact is to receive a second signal comprising a second value from the target system, the at least one indicator is to indicate the first connector has a first orientation with respect to the target system when the first value is greater than the second value, and the at least one indicator is to indicate the first connector has a different second orientation with respect to the target system when the first value is not greater than the second value.

5. The device of clause 3 or 4, wherein the first connector comprises a contact that is to receive power from the target system and provide the power to the at least one indicator.

6. The device of any one of clauses 1-5, wherein the first connector comprises first and second contacts, the second connector comprises third and fourth contacts, and the device further comprises: at least one switch connected to the first, second, third, and fourth contacts, the at least one switch to connect the first contact to a selected one of the third and fourth contacts based at least in part on at least one signal received from the target system, and to connect the second contact to another one of the third and fourth contacts.

7. The device of any one of clauses 1-6, wherein the first connector comprises a Universal Serial Bus ("USB") Type-C connector or a USB Type-C cable, and the second connector comprises a 40-pin ERM8 connector or a 40-pin ERF8 connector.

8. A system comprising: a connector; functional logic; and circuitry comprising a diagnostic portion connected to the functional logic, the circuitry to automatically connect the diagnostic portion to the connector when a diagnostic circuit is connected to the connector, the circuitry to automatically disconnect the diagnostic portion from the connector when the diagnostic circuit is disconnected from the connector, the diagnostic portion to transmit diagnostic information obtained from the functional logic to the diagnostic circuit when the diagnostic circuit is connected to the connector.

9. The system of clause 8, wherein the circuitry operates in a diagnostic mode when the diagnostic circuit is connected to the connector and in a functional mode when the diagnostic circuit is disconnected from the connector, and the circuitry is to automatically switch between the diagnostic and functional modes without the system being flashed, software executing on the system being shutdown, or the system being powered off.

10. The system of clause 8 or 9, wherein the diagnostic information comprises trace information, and the diagnostic portion of the circuitry comprises a trace engine to collect the trace information from the functional logic.

11. The system of clause 10, wherein the diagnostic information comprises scan information, and the diagnostic portion of the circuitry comprises a test master to collect the scan information from the functional logic.

12. The system of any one of clauses 8-11, wherein the diagnostic portion of the circuitry comprises a test master to collect scan information from the functional logic while the functional logic performs a scan operation, the diagnostic information comprises the scan information, the diagnostic portion of the circuitry comprises a scan island portion, and the diagnostic portion is to isolate the scan island portion from at least a portion of the functional logic during the scan operation.

13. The system of clause 12, wherein the diagnostic portion comprises one or more retention clamps, a source of an isolated clock signal isolated from the functional logic, and a source of an isolated reset signal isolated from the functional logic, the scan island portion to use the isolated clock signal and the isolated reset signal during the scan operation, and the one or more retention clamps to isolate the scan island portion from the portion of the functional logic during the scan operation.

14. The system of any one of clauses 8-13, further comprising local memory, wherein the diagnostic information is to comprise trace information, and the diagnostic portion of the circuitry is to transmit the trace information to the diagnostic circuit without first saving the trace information in the local memory.

15. The system of clause 14, wherein the diagnostic portion of the circuitry is to transmit the trace information to the diagnostic circuit without traffic over the connector being managed by at least one processor.

16. The system of any one of clauses 8-15, wherein the connector comprises first and second contacts connected to the circuitry, the circuitry to automatically connect the diagnostic portion to the connector when the diagnostic circuit provides a predetermined signal to the first and second contacts.

17. The system of any one of clauses 8-16, wherein the system is a System on a Chip ("SoC").

18. The system of clause 17, wherein the SoC is to be installed in an autonomous vehicle.

19. The system of clause 17, wherein the SoC is a component of a consumer electrical device.

20. The system of any one of clauses 8-19, wherein the connector comprises a Universal Serial Bus ("USB") Type-C connector or a USB Type-C cable.

21. A method comprising: generating a diagnostic mode signal within a target system after a diagnostic circuit is connected to a connector of the target system; connecting an access port within the target system to the connector in response to the diagnostic mode signal; receiving, via the connector, instructions using the access port from the diagnostic circuit; performing a diagnostic operation within the target system in accordance with the instructions; and transmitting diagnostic information obtained during performance of the diagnostic operation to the diagnostic circuit via the connector.

22. The method of clause 21, wherein the target system is a final product system or final platform and the diagnostic operation is performed as part of a field test.

23. The method of clause 21 or 22, further comprising: sending at least one signal encoding orientation information to the diagnostic circuit, the diagnostic circuit to display an indication of orientation based on the orientation information.

24. The method of any one of clauses 21-23, further comprising: determining the diagnostic operation is a scan operation, wherein performing the diagnostic operation in accordance with the instructions comprises isolating a portion of a circuit comprising a test master from output of functional logic not required by the scan operation.

25. The method of clause 24, wherein the scan operation is at least one of a scan dump or a ram dump.

26. The method of any one of clauses 21-25, wherein the diagnostic operation obtains one or more states of flip flops within the target system, and the diagnostic information comprises the one or more states.

27. The method of any one of clauses 21-26, wherein the diagnostic operation obtains one or more register values within the target system, and the diagnostic information comprises the one or more register values.

28. The method of any one of clauses 21-27, further comprising: sending power to the diagnostic circuit via the connector.

29. The method of any one of clauses 21-28, wherein the connector is a Universal Serial Bus ("USB") Type-C connector.

30. The method of any one of clauses 21-29, wherein the diagnostic information is transmitted without having been first stored in local memory.

31. The method of any one of clauses 21-30, wherein the diagnostic circuit receives the instructions from a computing device before providing the instructions to the target system, and the diagnostic circuit transmits the diagnostic information to the computing device after receiving the diagnostic information from the target system.

32. The method of clause 31, wherein the diagnostic circuit is a component of an adapter comprising first and second connectors, and the method further comprises: connecting the first connector of the diagnostic circuit to the connector of the target system, and connecting the second connector of the diagnostic circuit to a connector of the computing device.

33. The method of any one of clauses 21-32, wherein the target system executes software, and the target system generates the diagnostic mode signal, connects the access port to the connector, receives the instructions, and transmits the diagnostic information without assistance from the software.

34. The method of any one of clauses 21-33, further comprising: executing, by the target system, software before generating the diagnostic mode signal, the software having unexpectedly stopped execution before the target system generates the diagnostic mode signal, connects the access port to the connector, receives the instructions, and transmits the diagnostic information.

35. The method of clause 34, wherein the diagnostic information comprises register values generated by the software before the software unexpectedly stopped execution.

36. The method of any one of clauses 21-35, wherein the target system is non-responsive before the diagnostic circuit is connected to the connector of the target system.

37. The method of any one of clauses 21-36, further comprising: receiving, via first and second contacts of the connector, at least one predetermined signal value after the diagnostic circuit is connected to the connector, wherein the diagnostic mode signal is generated in response to the target system receiving the at least one predetermined signal value.

38. The method of any one of clauses 21-37, further comprising: transmitting, via first and second contacts of the connector, at least one predetermined signal value after the diagnostic circuit is connected to the connector, the diagnostic circuit comprising a connector that receives the at least one predetermined signal value and at least one indicator that indicates an orientation of the connector of the diagnostic circuit with respect to the connector of the target system based at least in part on the at least one predetermined signal value.

39. The method of clause 38, further comprising: sending power to the diagnostic circuit via the connector of the target system and the connector of the diagnostic circuit, wherein the diagnostic circuit providing the power to a circuit comprising the at least one indicator.

40. The method of any one of clauses 21-39, further comprising: the target system sending at least one signal encoding orientation information to a first connector of the diagnostic circuit, wherein the diagnostic circuit comprises a second connector connected to a computing device to transmit the diagnostic information to the computing device, the diagnostic circuit connecting first contacts of the first connector to second contacts of the second connector to form a first connection between the first and second connectors when the orientation information indicates the first connector is connected to the connector of the target system in a desired orientation, and the diagnostic circuit connecting the first contacts to different ones of the second contacts to form a second connection between the first and second connectors when the orientation information indicates the first connector is connected to the connector of the target system in an undesired orientation, both the first and second connections connecting contacts of the connector of the target system to same ones of the second contacts.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A device comprising:
   a first connector that, when connected to a deployed target system, automatically triggers the target system to enter a diagnostic mode, the first connector to receive, while the target system is in the diagnostic mode, diagnostic information transmitted from the target system without having been first stored in a local memory of the target system; and
   a second connector to send the diagnostic information, received from the target system via the first connector, to a computing system, wherein the device comprises a removable peripheral interface between the deployed target system and the computing system.

2. The device of claim 1, wherein the first connector comprises first and second contacts connected to ground, the first and second contacts to trigger the target system to automatically enter the diagnostic mode when connected to the target system.

3. The device of claim 1, further comprising:
   at least one indicator that indicates an orientation of the first connector with respect to the target system based at least in part on at least one signal received from the target system.

4. The device of claim 3, wherein the first connector is a Universal Serial Bus ("USB") Type-C connector comprising an SBU1 contact and an SBU2 contact,
   the SBU1 contact is to receive a first signal comprising a first value from the target system,
   the SBU2 contact is to receive a second signal comprising a second value from the target system,
   the at least one indicator is to indicate the first connector has a first orientation with respect to the target system when the first value is greater than the second value, and
   the at least one indicator is to indicate the first connector has a different second orientation with respect to the target system when the first value is not greater than the second value.

5. The device of claim 3, wherein the first connector comprises a contact that is to receive power from the target system and provide the power to the at least one indicator.

6. The device of claim 1, wherein the first connector comprises first and second contacts, the second connector comprises third and fourth contacts, and the device further comprises:
   at least one switch connected to the first, second, third, and fourth contacts, the at least one switch to connect the first contact to a selected one of the third and fourth contacts based at least in part on at least one signal received from the target system, and to connect the second contact to another one of the third and fourth contacts.

7. The device of claim 1, wherein the first connector comprises a Universal Serial Bus ("USB") Type-C connector or a USB Type-C cable, and
   the second connector comprises a 40-pin ERM8 connector or a 40-pin ERF8 connector.

8. The device of claim 1, wherein the first connector is hardwired to automatically trigger the target system to enter the diagnostic mode when the first connector is connected to the target system.

9. The device of claim 1, wherein the first connector comprises at least one contact hardwired to automatically trigger the target system to enter the diagnostic mode when the first connector is connected to the target system.

10. A system comprising:
    a connector;
    functional logic; and
    circuitry comprising a diagnostic portion connected to the functional logic, the circuitry to automatically connect the diagnostic portion to the connector when a diagnostic circuit is connected to the connector, the circuitry to automatically disconnect the diagnostic portion from the connector when the diagnostic circuit is disconnected from the connector, the diagnostic portion to transmit diagnostic information obtained from the functional logic to the diagnostic circuit, without having been first stored in a local memory of the functional logic, when the diagnostic circuit is connected to the connector.

11. The system of claim 10, wherein the circuitry operates in a diagnostic mode when the diagnostic circuit is connected to the connector and in a functional mode when the diagnostic circuit is disconnected from the connector, and
    the circuitry is to automatically switch between the diagnostic and functional modes without the system being flashed, software executing on the system being shutdown, or the system being powered off.

12. The system of claim 10, wherein the diagnostic information comprises trace information, and
    the diagnostic portion of the circuitry comprises a trace engine to collect the trace information from the functional logic.

13. The system of claim 12, wherein the diagnostic information comprises scan information, and
    the diagnostic portion of the circuitry comprises a test master to collect the scan information from the functional logic.

14. The system of claim 10, wherein the diagnostic portion of the circuitry comprises a test master to collect scan information from the functional logic while the functional logic performs a scan operation,
  the diagnostic information comprises the scan information,
  the diagnostic portion of the circuitry comprises a scan island portion, and
  the diagnostic portion is to isolate the scan island portion from at least a portion of
  the functional logic during the scan operation.

15. The system of claim 14, wherein the diagnostic portion comprises one or more retention clamps, a source of an isolated clock signal isolated from the functional logic, and a source of an isolated reset signal isolated from the functional logic,
  the scan island portion to use the isolated clock signal and the isolated reset signal during the scan operation, and
  the one or more retention clamps to isolate the scan island portion from the portion of the functional logic during the scan operation.

16. The system of claim 10, wherein the diagnostic information is to comprise trace information, and the diagnostic portion of the circuitry is to transmit the trace information to the diagnostic circuit without first saving the trace information in the local memory.

17. The system of claim 16, wherein the diagnostic portion of the circuitry is to transmit the trace information to the diagnostic circuit without traffic over the connector being managed by at least one processor.

18. The system of claim 10, wherein the connector comprises first and second contacts connected to the circuitry, the circuitry to automatically connect the diagnostic portion to the connector when the diagnostic circuit provides a predetermined signal to the first and second contacts.

19. The system of claim 10, wherein the system is a System on a Chip ("SoC").

20. The system of claim 19, wherein the SoC is to be installed in an autonomous vehicle.

21. The system of claim 19, wherein the SoC is a component of a consumer electrical device.

22. The system of claim 10, wherein the connector comprises a Universal Serial Bus ("USB") Type-C connector or a USB Type-C cable.

23. A method comprising:
  generating a diagnostic mode signal within a target system after a diagnostic circuit is connected to a connector of the target system;
  connecting an access port within the target system to the connector in response to the diagnostic mode signal;
  receiving, via the connector, instructions using the access port from the diagnostic circuit;
  performing a diagnostic operation within the target system in accordance with the instructions; and
  transmitting diagnostic information obtained during performance of the diagnostic operation to the diagnostic circuit via the connector without the diagnostic information having been first stored in a local memory of the target system.

24. The method of claim 23, wherein the target system is a final product system or final platform and the diagnostic operation is performed as part of a field test.

25. The method of claim 23, further comprising:
  sending at least one signal encoding orientation information to the diagnostic circuit, the diagnostic circuit to display an indication of orientation based on the orientation information.

26. The method of claim 23, further comprising:
  determining the diagnostic operation is a scan operation, wherein performing the diagnostic operation in accordance with the instructions comprises isolating a portion of a circuit comprising a test master from output of functional logic not required by the scan operation.

27. The method of claim 26, wherein the scan operation is at least one of a scan dump or a ram dump.

28. The method of claim 23, wherein the diagnostic operation obtains one or more states of flip flops within the target system, and the diagnostic information comprises the one or more states.

29. The method of claim 23, wherein the diagnostic operation obtains one or more register values within the target system, and the diagnostic information comprises the one or more register values.

30. The method of claim 23, further comprising:
  sending power to the diagnostic circuit via the connector.

31. The method of claim 23, wherein the connector is a Universal Serial Bus ("USB") Type-C connector.

32. The method of claim 23, wherein the diagnostic circuit receives the instructions from a computing device before providing the instructions to the target system, and
  the diagnostic circuit transmits the diagnostic information to the computing device after receiving the diagnostic information from the target system.

33. The method of claim 32, wherein the diagnostic circuit is a component of an adapter comprising first and second connectors, and the method further comprises:
  connecting the first connector of the diagnostic circuit to the connector of the target system, and
  connecting the second connector of the diagnostic circuit to a connector of the computing device.

34. The method of claim 23, wherein the target system generates the diagnostic mode signal, connects the access port to the connector, receives the instructions, and transmits the diagnostic information without assistance from the software.

35. The method of claim 23, further comprising:
  executing, by the target system, the software before generating the diagnostic mode signal, the software having unexpectedly stopped execution before the target system generates the diagnostic mode signal, connects the access port to the connector, receives the instructions, and transmits the diagnostic information.

36. The method of claim 35, wherein the diagnostic information comprises register values generated by the software before the software unexpectedly stopped execution.

37. The method of claim 23, wherein the target system is non-responsive before the diagnostic circuit is connected to the connector of the target system.

38. The method of claim 23, further comprising:
  receiving, via first and second contacts of the connector, at least one predetermined signal value after the diagnostic circuit is connected to the connector, wherein the diagnostic mode signal is generated in response to the target system receiving the at least one predetermined signal value.

39. The method of claim 23, further comprising:
  transmitting, via first and second contacts of the connector, at least one predetermined signal value after the diagnostic circuit is connected to the connector, the diagnostic circuit comprising a connector that receives the at least one predetermined signal value and at least one indicator that indicates an orientation of the connector of the diagnostic circuit with respect to the connector of the target system based at least in part on the at least one predetermined signal value.

40. The method of claim 39, further comprising:

sending power to the diagnostic circuit via the connector of the target system and the connector of the diagnostic circuit, wherein the diagnostic circuit providing the power to a circuit comprising the at least one indicator.

41. The method of claim 23, further comprising:

the target system sending at least one signal encoding orientation information to a first connector of the diagnostic circuit, wherein the diagnostic circuit comprises a second connector connected to a computing device to transmit the diagnostic information to the computing device, the diagnostic circuit connecting first contacts of the first connector to second contacts of the second connector to form a first connection between the first and second connectors when the orientation information indicates the first connector is connected to the connector of the target system in a desired orientation, and the diagnostic circuit connecting the first contacts to different ones of the second contacts to form a second connection between the first and second connectors when the orientation information indicates the first connector is connected to the connector of the target system in an undesired orientation, both the first and second connections connecting contacts of the connector of the target system to same ones of the second contacts.

\* \* \* \* \*